US012621061B2

(12) United States Patent
Olesen et al.

(10) Patent No.: US 12,621,061 B2
(45) Date of Patent: ***May 5, 2026

(54) HANDLING INTERFERENCE IN MULTI-RADIO ACCESS TECHNOLOGY (RAT) WIRELESS TRANSMIT/RECEIVE UNIT (WTRU)

(71) Applicant: InterDigital Patent Holdings, Inc., Wilmington, DE (US)

(72) Inventors: Robert L. Olesen, Huntington, NY (US); Rui Yang, Greenlawn, NY (US); Moon-il Lee, Melville, NY (US); Alphan Sahin, Westbury, NY (US); Hanqing Lou, Syosset, NY (US); Fengjun Xi, San Diego, CA (US); Frank La Sita, Long Beach, NY (US); Byung K. Yi, San Diego, CA (US); Janet A. Stern-Berkowitz, Little Neck, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/758,988

(22) Filed: Jun. 28, 2024

(65) Prior Publication Data

US 2024/0356659 A1    Oct. 24, 2024

Related U.S. Application Data

(63) Continuation of application No. 16/066,577, filed as application No. PCT/US2016/069093 on Dec. 29, 2016, now Pat. No. 12,068,793.

(Continued)

(51) Int. Cl.
*H04B 15/02* (2006.01)
*H04B 1/10* (2006.01)
(Continued)

(52) U.S. Cl.
CPC .............. *H04B 15/02* (2013.01); *H04B 1/10* (2013.01); *H04B 1/1027* (2013.01); *H04B 1/406* (2013.01);
(Continued)

(58) Field of Classification Search
CPC ...... H04B 15/00; H04B 15/02; H04B 17/318; H04B 1/10; H04B 1/1027; H04B 1/406; H04B 7/0413; H04W 16/14; H04W 88/06
See application file for complete search history.

(56) References Cited

U.S. PATENT DOCUMENTS 8,917,796 B1 * 12/2014 Mayrench ............ H04B 7/0697
375/267
8,965,294 B2 * 2/2015 Seo ........................ H04W 4/06
455/437
(Continued)

FOREIGN PATENT DOCUMENTS

CN        103733587 A      4/2014
CN        105075170 A      11/2015
(Continued)

OTHER PUBLICATIONS

3rd Generation Partnership Project (3GPP), S1-160129, "5G/E-UTRAN Multi-RATs Capable Devices", Gemalto, 3GPP TSG-SA WG1 Meeting #73, Okinawa, Japan, Feb. 1-5, 2016, 1 page.
(Continued)

*Primary Examiner* — Ayman A Abaza
*Assistant Examiner* — Hooman Houshmand
(74) *Attorney, Agent, or Firm* — Flaster Greenberg, P.C.

(57) ABSTRACT

Systems, methods, and instrumentalities are disclosed for transmitting a message. For example, a first radio access technology (RAT) and/or a second RAT may be determined. The first RAT may be determined for reception of data. The second RAT may be determined for the reception of the data,
(Continued)

perhaps for example based on an indication received via the first RAT. The data may be received via a first node associated with the first RAT and a second node associated with the second RAT.

13 Claims, 13 Drawing Sheets

Related U.S. Application Data

(60) Provisional application No. 62/339,335, filed on May 20, 2016, provisional application No. 62/272,936, filed on Dec. 30, 2015.

(51) Int. Cl.
| | |
|---|---|
| *H04B 1/403* | (2015.01) |
| *H04B 7/0413* | (2017.01) |
| *H04B 15/00* | (2006.01) |
| *H04B 17/318* | (2015.01) |
| *H04W 16/14* | (2009.01) |
| *H04W 88/06* | (2009.01) |

(52) U.S. Cl.
CPC ........... *H04B 7/0413* (2013.01); *H04B 15/00* (2013.01); *H04W 16/14* (2013.01); *H04W 88/06* (2013.01)

(56) References Cited

U.S. PATENT DOCUMENTS

| | | | |
|---|---|---|---|
| 9,203,576 B2 | 12/2015 | Frenne et al. | |
| 9,271,265 B2 | 2/2016 | Lee et al. | |
| 9,591,636 B2 | 3/2017 | Papasakellariou et al. | |
| 10,064,216 B2 | 8/2018 | Nagata et al. | |
| 10,462,675 B2 | 10/2019 | Gosh et al. | |
| 10,560,297 B1 | 2/2020 | Baldemair et al. | |
| 11,071,124 B2 | 7/2021 | Yi et al. | |
| 2008/0134276 A1 | 6/2008 | Orrell et al. | |
| 2009/0238131 A1 | 9/2009 | Montojo et al. | |
| 2010/0124184 A1* | 5/2010 | Dayal | H04W 16/14 |
| | | | 370/328 |
| 2010/0279724 A1 | 11/2010 | Li et al. | |
| 2011/0072347 A1 | 3/2011 | Krampf et al. | |
| 2011/0111781 A1* | 5/2011 | Chen | H04L 5/0094 |
| | | | 455/507 |
| 2011/0274059 A1* | 11/2011 | Brown | H04L 5/0064 |
| | | | 370/329 |
| 2011/0317657 A1* | 12/2011 | Chmiel | H04W 72/23 |
| | | | 370/310 |
| 2012/0052899 A1 | 3/2012 | Wang et al. | |
| 2012/0087261 A1 | 4/2012 | Yoo et al. | |
| 2012/0106374 A1* | 5/2012 | Gaal | H04L 5/0048 |
| | | | 370/252 |
| 2012/0113961 A1 | 5/2012 | Krishnamurthy | |
| 2012/0115521 A1* | 5/2012 | Tong | H04L 5/0048 |
| | | | 455/501 |
| 2012/0140743 A1* | 6/2012 | Pelletier | H04W 76/15 |
| | | | 370/335 |
| 2012/0155362 A1 | 6/2012 | Montojo et al. | |
| 2012/0163335 A1* | 6/2012 | Chung | H04L 5/0023 |
| | | | 370/329 |
| 2012/0307749 A1* | 12/2012 | Banister | H04B 1/0475 |
| | | | 370/329 |
| 2012/0329400 A1 | 12/2012 | Seo et al. | |
| 2013/0010766 A1* | 1/2013 | Sadek | H04W 52/243 |
| | | | 370/336 |
| 2013/0194931 A1* | 8/2013 | Lee | H04W 72/04 |
| | | | 370/329 |
| 2013/0208587 A1 | 8/2013 | Bala et al. | |
| 2013/0308572 A1 | 11/2013 | Sayana et al. | |
| 2014/0036805 A1 | 2/2014 | Sadek et al. | |
| 2014/0036806 A1 | 2/2014 | Chen et al. | |

| | | | |
|---|---|---|---|
| 2014/0050201 A1 | 2/2014 | Onggosanusi et al. | |
| 2014/0094125 A1 | 4/2014 | Behravan et al. | |
| 2014/0204849 A1* | 7/2014 | Chen | H04L 5/0053 |
| | | | 370/329 |
| 2014/0233457 A1 | 8/2014 | Koutsimanis et al. | |
| 2014/0334436 A1 | 11/2014 | Qu et al. | |
| 2015/0119056 A1 | 4/2015 | Lee et al. | |
| 2015/0188650 A1 | 7/2015 | Au et al. | |
| 2015/0208392 A1 | 7/2015 | Park et al. | |
| 2015/0223075 A1* | 8/2015 | Bashar | H04W 74/08 |
| | | | 370/329 |
| 2015/0256307 A1 | 9/2015 | Nagata et al. | |
| 2015/0257139 A1 | 9/2015 | Chen et al. | |
| 2016/0043849 A1 | 2/2016 | Lee et al. | |
| 2016/0044699 A1 | 2/2016 | Deng et al. | |
| 2016/0050635 A1 | 2/2016 | Choi et al. | |
| 2016/0128084 A1 | 5/2016 | Novlan et al. | |
| 2016/0150391 A1 | 5/2016 | Lee et al. | |
| 2016/0174238 A1* | 6/2016 | Chen | H04W 72/23 |
| | | | 370/336 |
| 2016/0234736 A1* | 8/2016 | Kubota | H04L 12/18 |
| 2016/0262170 A1 | 9/2016 | Lee et al. | |
| 2016/0353452 A1 | 12/2016 | Chen et al. | |
| 2017/0094622 A1* | 3/2017 | Hahn | H04W 56/00 |
| 2017/0285130 A1 | 10/2017 | Kim et al. | |
| 2017/0311172 A1 | 10/2017 | Van Phan et al. | |
| 2018/0049055 A1* | 2/2018 | Wiberg | H04W 24/10 |
| 2018/0070369 A1* | 3/2018 | Papasakellariou | H04W 72/20 |
| 2018/0212732 A1* | 7/2018 | You | H04L 5/0051 |
| 2019/0229840 A1* | 7/2019 | Takeda | H04L 5/0094 |
| 2019/0342888 A1 | 11/2019 | Hosseini et al. | |
| 2020/0053758 A1 | 2/2020 | Hosseini et al. | |
| 2020/0382354 A1 | 12/2020 | Sengupta et al. | |

FOREIGN PATENT DOCUMENTS

| | | | |
|---|---|---|---|
| JP | 2012/235341 A | 11/2012 | |
| JP | 2014/517641 A | 7/2014 | |
| WO | WO 2012/109439 A1 | 8/2012 | |
| WO | WO 2014/070311 A1 | 5/2014 | |
| WO | WO 2014/153365 A1 | 9/2014 | |
| WO | WO 2015/000157 A1 | 1/2015 | |
| WO | WO 2015/149880 A1 | 10/2015 | |
| WO | WO 2016/105570 A1 | 6/2016 | |
| WO | WO 2016/130175 A1 | 8/2016 | |
| WO | WO 2017/005295 A1 | 1/2017 | |

OTHER PUBLICATIONS

3rd Generation Partnership Project (3GPP), R1-154659, "Narrowband LTE—Concept Description", Ericsson LM, Nokia Networks, AT&T, Alcatel-Lucent, Alcatel-Lucent Shanghai Bell, Intel, Sierra Wireless S.A., Sequans Communications, ZTE Corporation, SHARP Corporation, Gemalto N.V., Sprint Corporation, 3GPP TSG RAN WG1 Meeting #82, Beijing, China, Aug. 24-28, 2015, pp. 1-9.

3rd Generation Partnership Project (3GPP), R1-156010, "NB-LTE—General LI Concept Description", Ericsson, Alcatel-Lucent, Alcatel-Lucent Shanghai Bell, Nokia, Intel, ZTE, Samsung, 3GPP TSG-RAN WG1 #82bis, Malmo, Sweden, Oct. 5-9, 2015, pp. 1-16.

3rd Generation Partnership Project (3GPP), R1-1613263, "WF on LTE-NR Coexistence", Huawei, HiSilicon, AT&T, Orange, 3GPP TSG RAN WG1 #87, Reno, USA, Nov. 14-18, 2016, 11 pages.

3rd Generation Partnership Project (3GPP), R1-162157, "Overview of 5G Frame Structure", Huawei, HiSilicon, 3GPP TSG RAN WG1 Meeting #84bis, Busan, Korea, Apr. 11-15, 2016, 6 pages.

3rd Generation Partnership Project (3GPP), R1-1700390, "Further Considerations on NR/LTE Coexistence", Intel Corporation, 3GPP TSG RAN WG1 NR Ad-Hoc Meeting, Spokane, USA, Jan. 16-20, 2017, 4 pages.

3rd Generation Partnership Project (3GPP), R1-1700630, "LTE-NR Co-Existence for Downlink", NTT DoCoMo, Inc., 3GPP TSG RAN WG1 AH_NR Meeting, Spokane, USA, Jan. 16-20, 2017, 6 pages.

3rd Generation Partnership Project (3GPP), R1-160583, "Proposed Objective and Requirements on Dynamic Co-Existence of LTE and

(56) References Cited

OTHER PUBLICATIONS

Next Generation RAT", AT&T, 3GPP TSG RAN Meeting #71, Goteborg, Sweden, Mar. 7-10, 2016, 3 pages.

3rd Generation Partnership Project (3GPP), TR 38.913 V0.2.0, "Technical Specification Group Radio Access Network, Study on Scenarios and Requirements for Next Generation Access Technologies, (Release 14)", Feb. 2016, pp. 1-19.

3rd Generation Partnership Project (3GPP), TS 36.300 V13.2.0, "Technical Specification Group Radio Access Network, Evolved Universal Terrestrial Radio Access (E-UTRA) and Evolved Universal Terrestrial Radio Access Network (E-UTRAN), Overall Description, Stage 2 (Release 13)", Dec. 2015, pp. 1-290.

3rd Generation Partnership Project (3GPP), TS 36.321 VS.12.0, "Technical Specification Group Radio Access Network, Evolved Universal Terrestrial Radio Access (E-UTRA), Medium Access Control (MAC) Protocol Specification (Release 8)", Mar. 2012, pp. 1-47.

3rd Generation Partnership Project (3GPP), R2-162228, "Inter-RAT Mobility with LTE", Samsung, 3GPP TSG-RAN WG2 Meeting #93bis, Dubrovnik, Croatia, Apr. 11-15, 2016, 3 pages.

3rd Generation Partnership Project (3GPP), R2-162783, "Multi-RAT RAN and CN", Qualcomm Incorporated, 3GPP TSG-RAN WG2 Meeting #93bis, Dubrovnik, Croatia, Apr. 11-15, 2016, 3 pages.

Third Generation Partnership Project (3GPP), "Numerology for the 5G new radio interface", CATT, 3GPP TSG RAN WG1 Meeting #84bis, R1-162307, Busan, Korea, Apr. 11-15, 2016, 3 pages.

Third Generation Partnership Project (3GPP), "Clarification on MBSFN subframe handling for BL/CE UEs", CATT, 3GPP TSG RAN WG1 Meeting #84bis, R1-163093, Busan, Korea, Apr. 11-15, 2016, 3 pages.

* cited by examiner

--Prior Art--

100

--Prior Art--

Figure 1C:
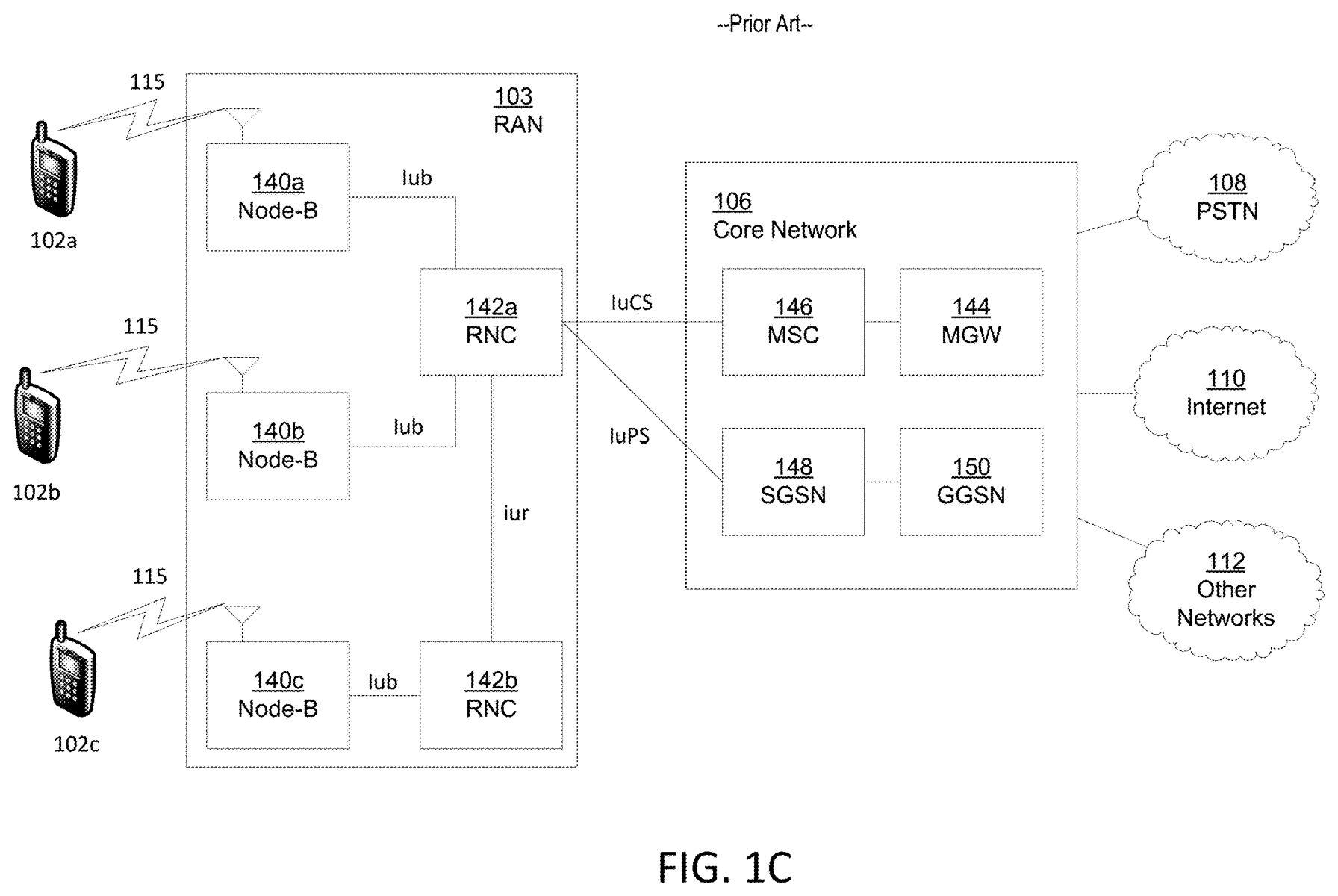

--Prior Art--

108 PSTN

110 Internet

112 Other Networks

106 Core Network

144 MGW

150 GGSN

146 MSC

148 SGSN

IuCS

IuPS

103 RAN

142a RNC iur

142b RNC

Iub

Iub

Iub

140a Node-B

140b Node-B

140c Node-B

--Prior Art--

HANDLING INTERFERENCE IN MULTI-RADIO ACCESS TECHNOLOGY (RAT) WIRELESS TRANSMIT/RECEIVE UNIT (WTRU)

CROSS-REFERENCE TO RELATED APPLICATIONS

This application is a continuation of U.S. Non-Provisional application Ser. No. 16/066,577, filed on Jun. 27, 2018, which is the National Stage entry under 35 U.S.C. § 371 of Patent Cooperation Treaty Application PCT/US2016/069093, filed Dec. 29, 2016, which claims the benefit of U.S. Provisional Patent Application No. 62/339,335, filed on May 20, 2016, and U.S. Provisional Patent Application No. 62/272,936, filed on Dec. 30, 2015, the entire contents of which are incorporated herein by reference.

BACKGROUND

Mobile communication may employ multiple-input and multiple-output, or MIMO. MIMO may multiply the capacity of a radio link using multiple transmit and receive antennas to exploit multipath propagation. MIMO may employ the use of multiple antennas at the transmitter and the receiver. MIMO may also employ techniques for sending and receiving more than one data signal simultaneously, perhaps over the same radio link, by exploiting multipath propagation. Mobile communication is in continuous evolution and is at the doorstep of a fifth incarnation—5G.

SUMMARY

Systems, methods, and instrumentalities are disclosed for transmitting a message. For example, a first radio access technology (RAT) and a second RAT may be determined. The first RAT may be determined for reception of data. The second RAT may be determined for the reception of the data, based on an indication received via the first RAT. The data may be received via a first node associated with the first RAT and a second node associated with the second RAT.

A WTRU may be configured to utilize a dynamic RAT configuration. For example, the WTRU may be configured with a primary RAT and a secondary RAT. The secondary RAT may be determined based on an indication from the primary RAT. A WTRU may be configured to report a preferred RAT. For example, a WTRU may select one or more preferred RATs based on one or more criteria (e.g., measurements) and may report a preferred RAT out of a plurality of RATs that may be used for a multi-RAT transmission. A WTRU may be configured to use a directed RAT and/or a RAT otherwise specified by the network. For example, a WTRU may send a probe signal which may be associated with a certain RAT (e.g., a preferred RAT) using a known uplink resource. The WTRU may receive a confirmation signal that is transmitted based on the RAT indicated by the probe signal.

As an example, one RAT may correspond to a Long Term Evolution (LTE) RAT (e.g., a first RAT that, for example, utilizes OFDMA) and a second RAT may correspond to a new RAT (NR) that may be used for 5G communications. The WTRU may be configured to coordinate transmissions to and/or from a first RAT (e.g., LTE) and a second RAT (e.g., a NR), for example, using partial resource puncturing to ensure a desired signal reception quality is met for higher priority transmission. The WTRU may be configured to determine a RAT signal type (e.g., a NR RAT signal type)

based on whether or not the resources utilized for transmission of the RAT signal overlap with the signal from another RAT (e.g., such as whether it overlaps with an LTE RAT signal). The WTRU may be configured to determine one or more of the type of waveform, the numerology for the RAT, the RAT frame structure, and/or the RAT multiple access scheme based on the RAT signal type (e.g., the NR signal type). The WTRU may be configured to receive a downlink control channel that is used for dynamic cross-RAT scheduling.

For example, a RAT flag in the downlink control channel may indicate which RAT the downlink control information (DCI) is applicable to. The WTRU may interpret the downlink control channel based on a primary RAT configuration or secondary RATs configuration (e.g., depending on which RAT the DCI is determined to be applicable to). Sounding Reference Signal (SRS) transmission for one or more, or multiple, RATs (e.g., LTE and NR) be performed in a coordination set and/or the WTRU may be configured to determine an appropriate RAT to use for an SRS transmission.

A wireless transmit/receive unit (WTRU) may comprise a memory. The WTRU may comprise a receiver. The receiver may be configured to receive a first configuration. The first configuration may include one or more first resources for communication via a first radio access technology (RAT). The receiver may be configured to receive a second configuration. The second configuration may include one or more second resources for communication via at least one of the first RAT or a second RAT. The WTRU may comprise a processor. The processor may be configured to associate the one or more first resources with the first RAT. The processor may be configured to associate the one or more second resources with the first RAT and the second RAT, such that a first signal communicated via the first RAT and a second signal communicated via the second RAT may overlap in at least one of the one or more second resources. The receiver may be further configured to receive the first signal via the first RAT and the one or more second resources. The receiver may be configured to receive the second signal via the second RAT and the one or more second resources. The processor may be further configured to puncture the at least one of the one or more second resources associated with the first RAT such that the second signal may be received via the second RAT without interference from the first signal via the first RAT in the at least one of the one or more second resources.

A wireless transmit/receive unit (WTRU) may comprise a memory. The WTRU may comprise a receiver. The receiver may be configured to receive a first control channel for a first radio access technology (RAT) in one or more first time periods. The receiver may be configured to receive a second control channel for a second RAT in one or more second time periods. The WTRU may comprise a processor. The processor may be configured to monitor the first control channel in at least one of the one or more first time periods. The processor may be configured to detect an indication in the first control channel to monitor the second control channel in at least one of the one or more second time periods. The at least one of the one or more second time periods may be at least one of a time period within the at least one of the one or more first time periods, or a time period following the at least one of the one or more first time periods. The processor may be configured to monitor the second control channel in the at least one of the one or more second time periods upon a detection of the indication. The processor may be configured to coordinate joint communication across the first RAT and the second RAT based at least on the first control channel and the second control channel.

BRIEF DESCRIPTION OF THE DRAWINGS

A more detailed understanding may be had from the following description, given by way of example in conjunction with the accompanying drawings wherein:

FIG. 1C is a system diagram of an example radio access network and an example core network that may be used within the communications system illustrated in FIG. 1A;

DETAILED DESCRIPTION

A detailed description of illustrative embodiments will now be described with reference to the various Figures. Although this description provides a detailed example of possible implementations, it should be noted that the details are intended to be examples and in no way limit the scope of the application.

Figure 1A:
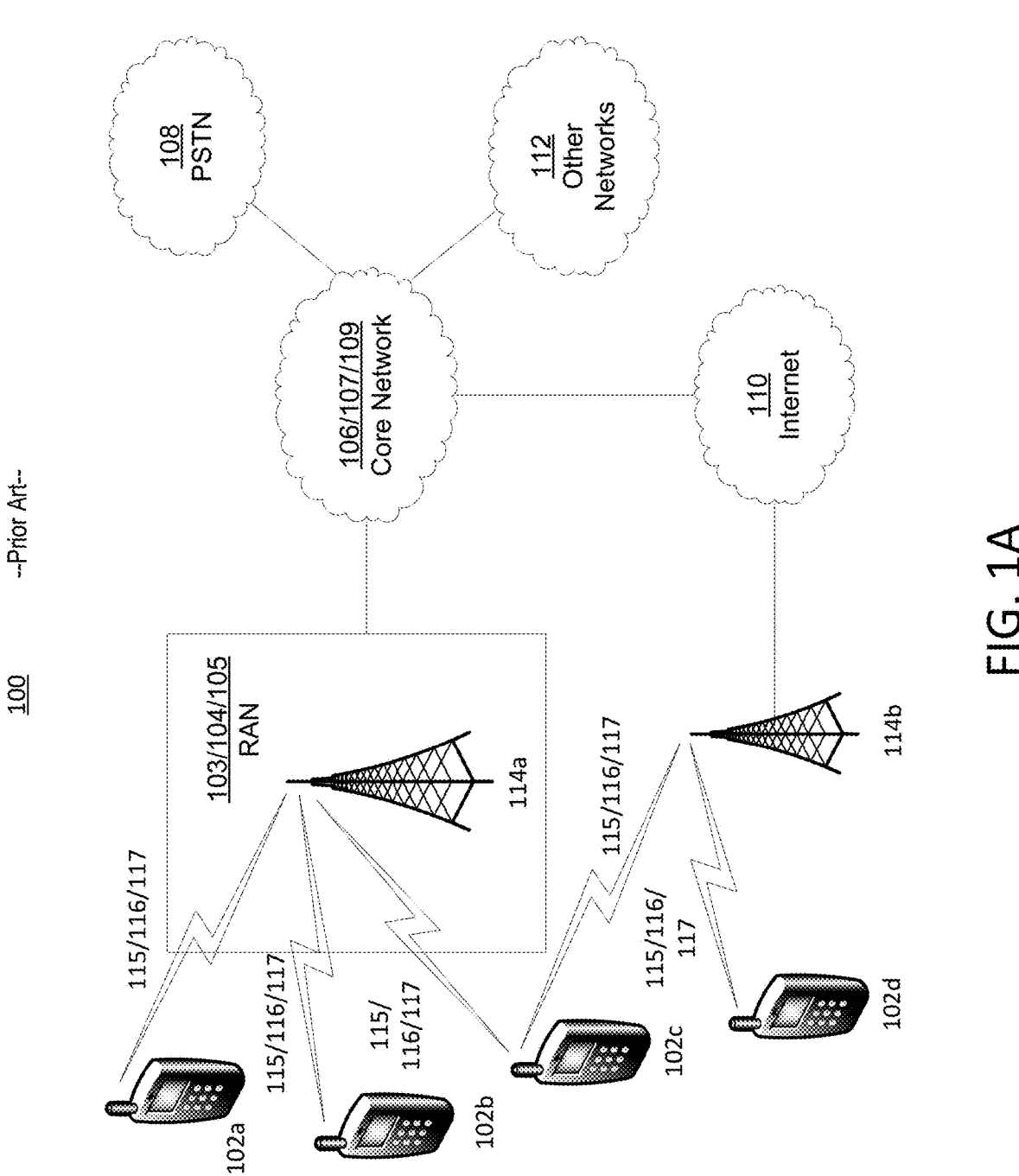
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
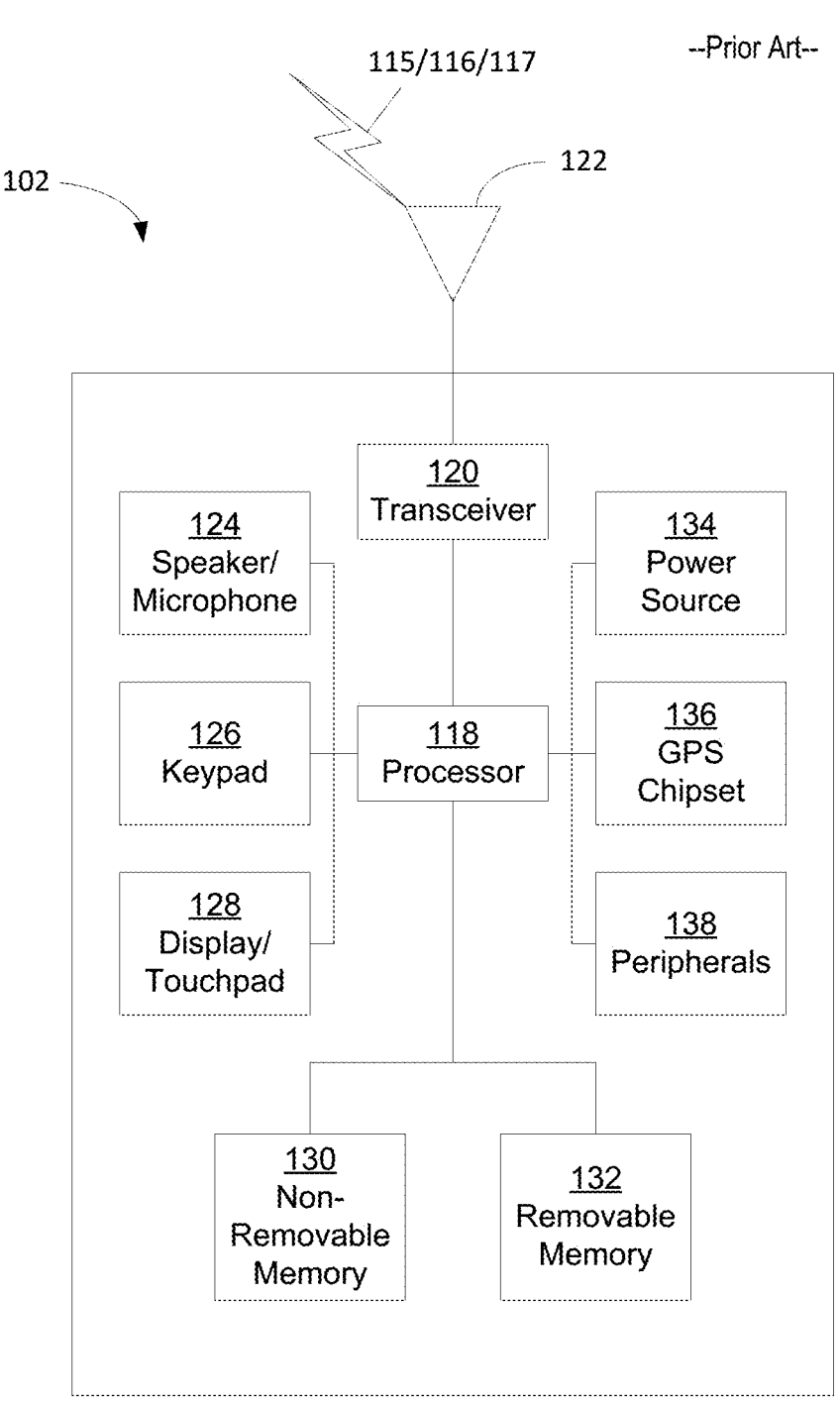
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

FIG. 1C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN

103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
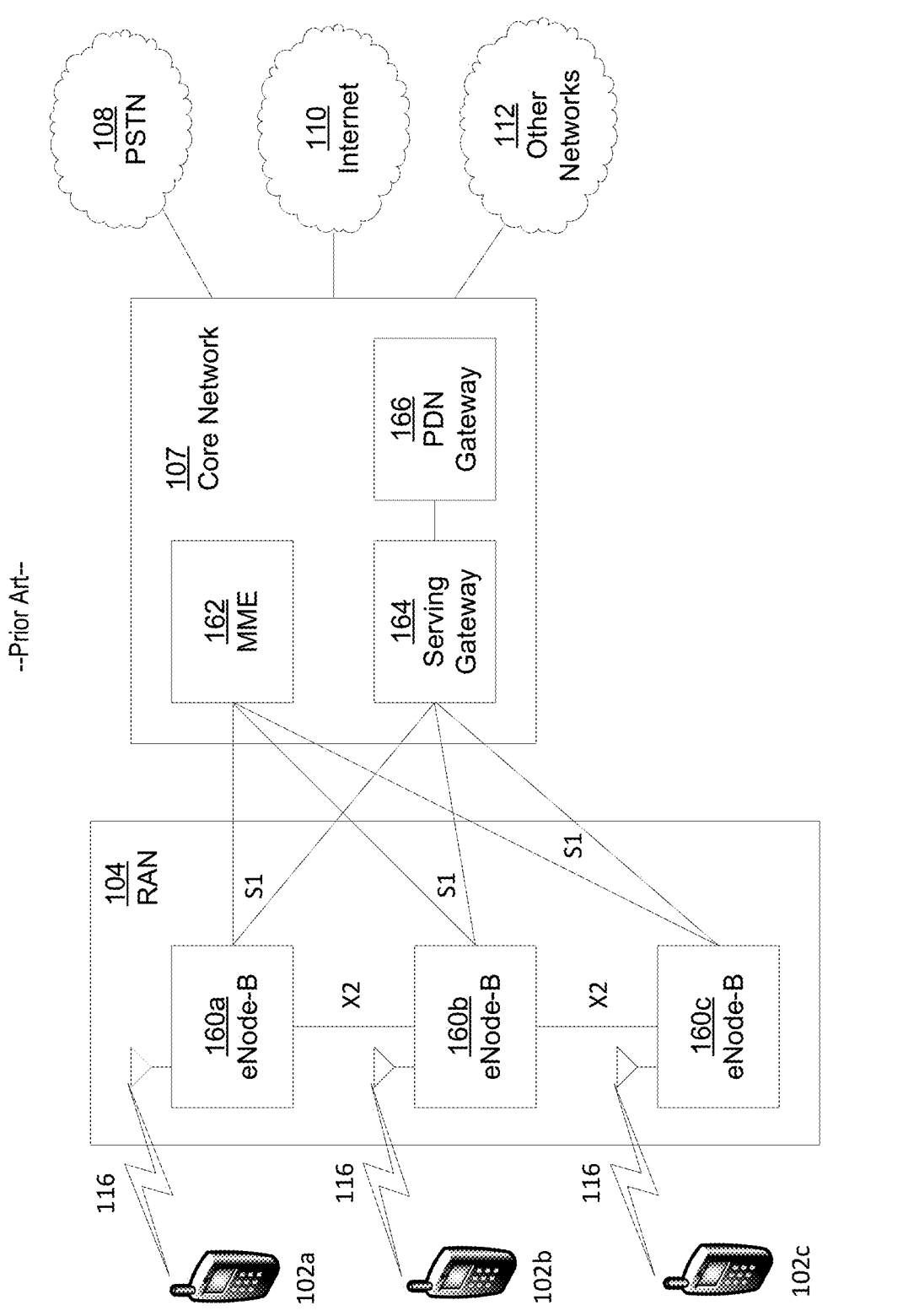
FIG. 1D is a system diagram of another example radio access network and an example core network that may be used within the communications system illustrated in FIG. 1A.

FIG. 1D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink and/or downlink, and the like. As shown in FIG. 1D, the eNode-Bs 160a, 160b, 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 1E:
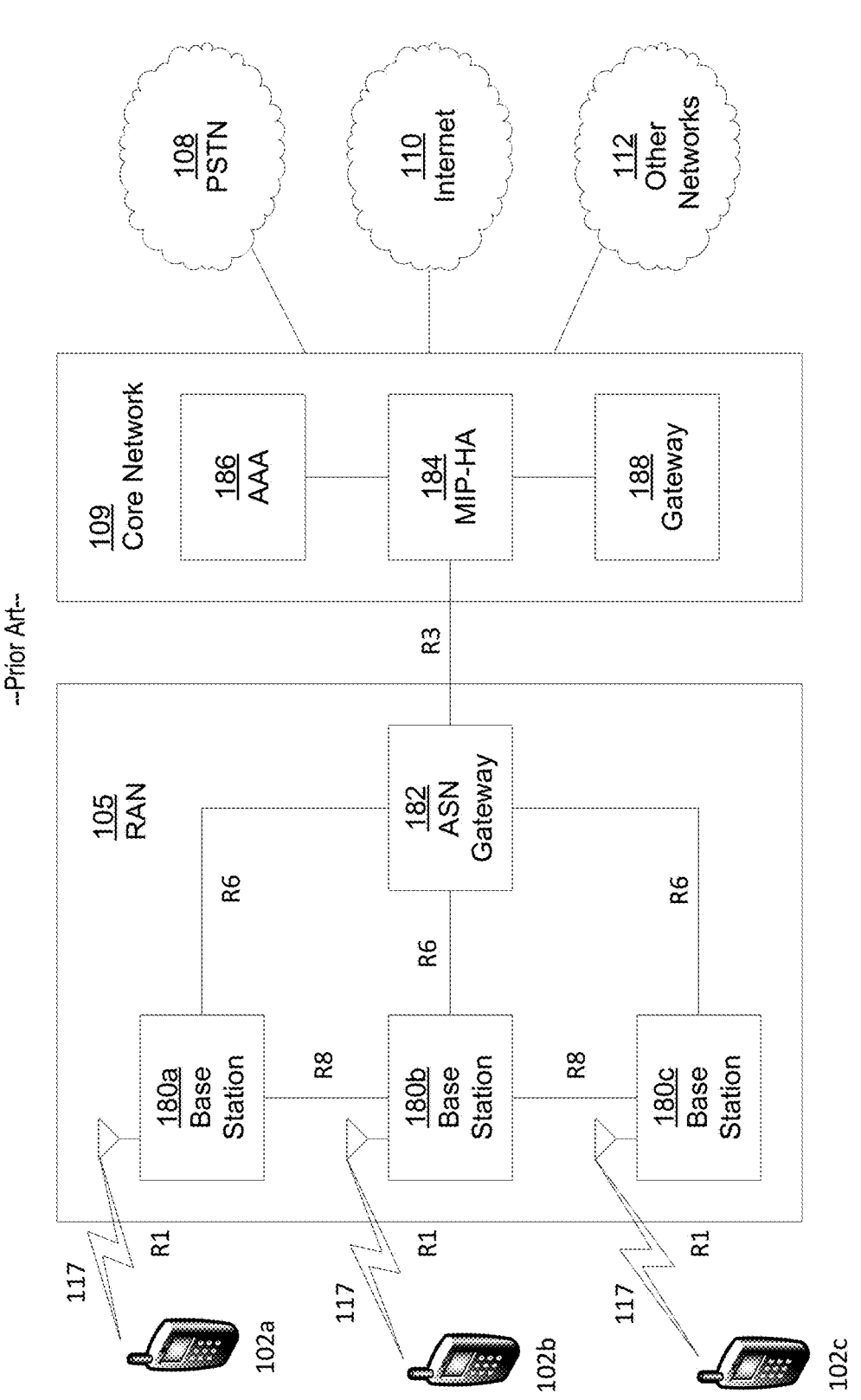
FIG. 1E is a system diagram of another example radio access network and an example core network that may be used within the communications system illustrated in FIG. 1A.

FIG. 1E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 1E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In one embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QOS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102*b*, 102*c* between the RAN 105 and the other ASNs. The communication link between the core network 109 and the other core networks may be defined as an R5 reference, which may include protocols for facilitating interworking between home core networks and visited core networks.

In view of FIGS. 1A-1E, and the corresponding description of FIGS. 1A-1E, one or more, or all, of the functions described herein with regard to one or more of: WTRU 102*a-d*, Base Station 114*a-b*, Node B 140*a-c*, RNC 142*a-b*, MSC 146, SGSN 148, MGW 144, CGSN 150, eNode-B 160*a-c*, MME 162, Serving Gateway 164, PDN Gateway 166, Base Station 180*a-c*, ASN Gateway 182, AAA 186, MIP-HA 184, and/or Gateway 188, or the like, may be performed by one or more emulation devices (not shown) (e.g., one or more devices configured to emulate one or more, or all, of the functions described herein).

The one or more emulation devices may be configured to perform the one or more, or all, functions in one or more modalities. For example, the one or more emulation devices may perform the one or more, or all, functions while being fully or partially implemented/deployed as part of a wired and/or wireless communication network. The one or more emulation devices may perform the one or more, or all, functions while being temporarily implemented/deployed as part of a wired and/or wireless communication network. The one or more emulation devices may perform the one or more, or all, functions while not being implemented/deployed as part of a wired and/or wireless communication network (e.g., such as in a testing scenario in a testing laboratory and/or a non-deployed (e.g. testing) wired and/or wireless communication network, and/or testing performed on one or more deployed components of a wired and/or wireless communication network). The one or more emulation devices may be test equipment.

The following abbreviations and/or acronyms may be used to describe one or more examples techniques and/or devices herein:

COMP Coordinated Multi-Point transmission/reception
CQI Channel Quality Indicator
CSI Channel State Information
D2D Device to Device transmissions (e.g. LTE Sidelink)
DL Downlink
DM-RS Demodulation Reference Signal
IP Internet Protocol
LAA License Assisted Access
LBT Listen-Before-Talk
LTE Long Term Evolution e.g. from 3GPP LTE R8 and up
MIMO Multiple Input Multiple Output
PHY Physical Layer
QoS Quality of Service (from the physical layer perspective)
RS Reference Signal
SOM Spectrum Operation Mode
TTI Transmission Time Interval (e.g., in integer multiple of one or more TI)
UL Uplink
V2V Vehicle to vehicle communications
V2X Vehicular communications
WLAN Wireless Local Area Networks and related technologies (IEEE 802.xx domain)

The 5G air interface may enable the following use cases: improved broadband performance (IBB); industrial control and communications (ICC) and vehicular applications (V2X); and/or massive machine-type communications (mMTC). These use cases may drive the expected requirements for the 5G air interface.

Supporting ultra-low transmission latency may be a design goal of a 5G system. Air interface latency (e.g., as low as 1 ms round trip time (RTT)) may utilize transmit time intervals (TTIs), for example TTIs less than 1 ms. For example, air interface latency (e.g., as low as 1 ms RTT) may be achieved for TTIs somewhere between 100 us and 250 us. Support for ultra-low access latency (e.g., time from initial system access until the completion of the transmission of the first user plane data unit) may be of interest and may be a design goal of a 5G system. Support for ultra-low access latency (e.g., time from initial system access until the completion of the transmission of the first user plane data unit) may be of interest, but may be of lesser priority. ICC and/or V2X may require end-to-end (c2c) latency of less than 10 ms.

Supporting ultra-reliable transmission may be a design goal of a 5G system. A design consideration (e.g., a key design consideration) may be transmission reliability, e.g., transmission reliability that is better (e.g., much better) than what is possible with legacy LTE systems. For example, a target for transmission reliability may be 99.999% transmission success and/or service availability. Support for mobility, e.g., for speed in the range of 0-500 km/h, may be considered. ICC and/or V2X may require Packet Loss Ratio of less than $10e^{-6}$.

Supporting MTC operation (e.g., narrowband operation) may be a design goal of 5G systems. The air interface may support narrowband operation (e.g., efficiently support narrowband operation, such as using less than 200 KHz), extend battery life (e.g., up to 15 years of autonomy), and minimize communication overhead (e.g., for small and/or infrequent data transmissions, such as low data rate in the range of 1-100 kbps) with access latency of seconds, hours, etc.

Supporting varying spectrum operating modes may be a design goal of 5G systems. The WTRU may be configured to perform transmissions, e.g., according to one or more Spectrum Operating Modes (SOMs). For example, a SOM may correspond to transmissions that use and/or are defined by one or more of the following: a TTI duration, an initial power level, a HARQ processing type, an upper bound for successful HARQ reception/transmission, a transmission mode, a physical channel (e.g., uplink and/or downlink), a waveform type, and/or a transmission according to a RAT (e.g., legacy LTE, and/or according to a 5G transmission method). A SOM may correspond to a QoS level and/or related aspect (e.g., maximum/target latency, maximum/target BLER, and/or similar). A SOM may correspond to a spectrum area and/or to a specific control channel and/or aspect thereof (e.g., search space, DCI type, etc.).

To achieve requirements for 5G air interface (e.g., for the IBB), the spectral efficiency enhancement may be used (e.g., may be required). The spectral efficiency (e.g., per user throughput and/or area throughput improvements available from the use of MIMO transmission techniques) may be improved, for example, using spatial multiple input multiple output (MIMO) techniques. The initial introduction of MIMO may be for per user MIMO transmission methods (e.g., Single User (SU) MIMO) which may be improved per user throughput. This may have been extended to Multi-User (MU) MIMO and/or Cooperative MultiPoint (COMP), where one or more, or multiple, antennas may be used, e.g., to serve one or more, or multiple, users and/or improve area throughput. Users of these technologies may be configured by the node they are connected to (e.g., eNodeB, AP, etc.), e.g., to benefit from the availability of these MIMO transmission methods.

The recent development of Massive MIMO may improve (e.g., further improve) the per user SNR, e.g., by leveraging the use of a large number of Tx antennas.

Figure 2:
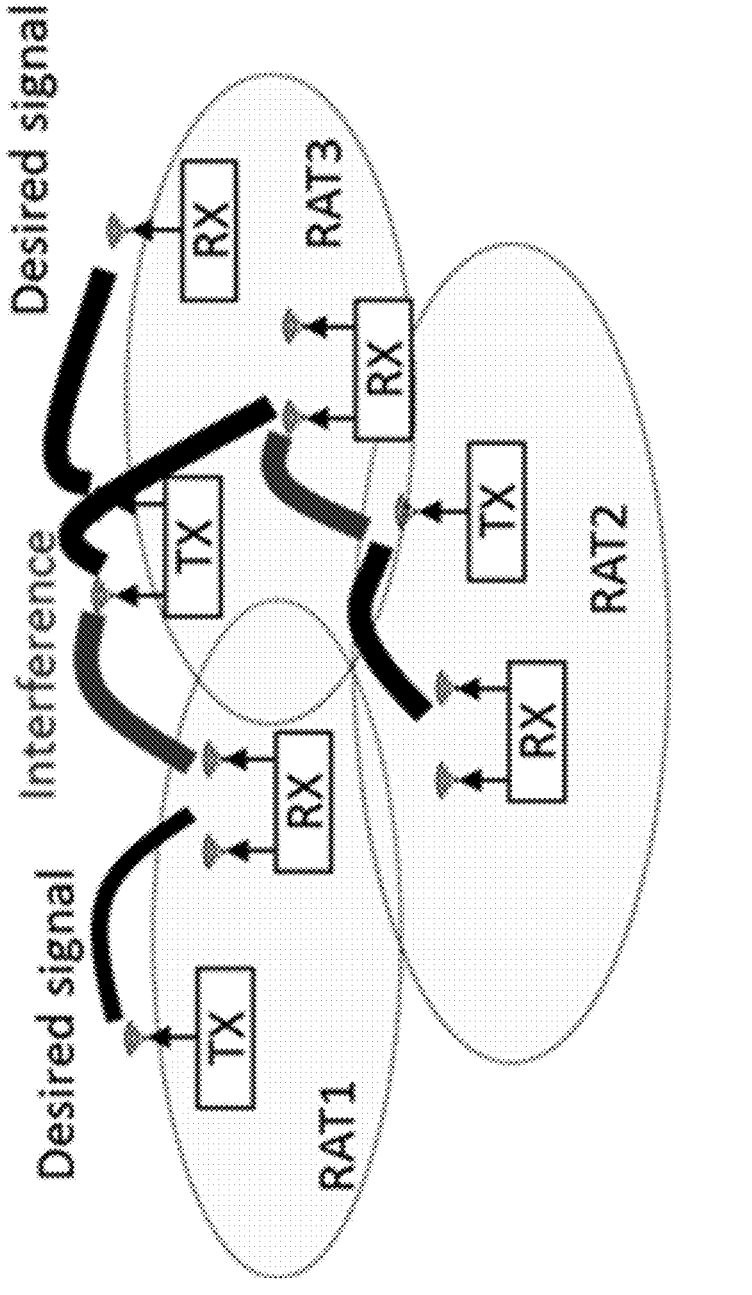
FIG. 2 depicts an example multi-radio access technology (RAT) interference.

Multi-RAT interference may be described. As shown in FIG. 2, RAT using a spectrum shared by other RATs may suffer from inter-RAT interference, e.g., due to its contention-based resource sharing across different RATs. For example, LTE unlicensed (LTE-U) and/or WiFi may share the same frequency resources and/or one or more of the RATs (e.g., LTE-U and/or WiFi) may use the spectrum, e.g., if the spectrum is not occupied by the other RAT. There may still be inter-RAT interference, e.g., due to hidden node problem, unreliable listen before talk, etc.

Multi-RAT MIMO may be described. A collaborative multi-point (COMP) may be used to improve the MIMO gain, e.g., by utilizing the transmission antennas distributed over geographically separated locations. For example, one or more, or multiple, transmission points (e.g., base stations) may be used to transmit a signal to a mobile. The interfering signal may turn into a desired signal and/or the signal to interference and/or noise ratio (SINR) at the mobile may get improved (e.g., significantly improved). Massive MIMO (e.g., in which a large number of antennas may be used to improve the MIMO gains) may show that using nearby transmission points to increase the number of antennas (e.g., for higher degree of freedom of the spatial channel) may provide gain (e.g., significant gain).

The use of nearby available transmission/reception nodes of different RATs for personal MIMO data transceiver improvements may be prohibited, e.g., for a host of reasons. The use of nearby available transmission/reception nodes of different RATs for personal MIMO data transceiver improvements may be prohibited for one or more of the following reasons: incompatible air interface between RATs (e.g., cellular to WiFi, WiFi to Bluetooth, etc.); incompatible radio stacks; inconsistent user policies for use of different MIMO based services; and/or discovery of and/or association with nearby MIMO transceivers, which have inconsistent capabilities and/or procedures (e.g., eNodeB, WiFi, and/or Bluetooth beacons may be unique and/or different).

Spectrum may be shared by LTE and/or a New RAT (NR), for example, a RAT being used for deployment of a 5G network. When used herein, the term may referred to a radio access technology that is in consideration for use for 5G radio access. Examples of a NR may include LTE and/or 3GPP New Radio; LTE Advanced and/or 3GPP New Radio Ultra Reliable Low Latency Communications (URLLC); and LTE and/or 3GPP New Radio Enhanced Mobile Broadband (eMBB). A NR may be OFDM-based or non-OFDM-based. For example, a spectrum may be shared by LTE and/or New RAT (NR) in an initial deployment of 5G network. For example, one or more legacy LTE WTRUs might not have a capability of supporting NR, so the initial deployments and/or later deployments may utilize the shared spectrum to enable access by the legacy devices. For example, an LTE network may cover macro areas and/or an NR network may cover hotspot areas, for example, to increase peak throughput.

The WTRUs in areas (e.g., overlapped areas) between LTE and NR may incur an interference from a RAT (e.g., another RAT, such as LTE and/or NR), for example, which may result in performance changes (e.g., degradation) of system and/or WTRU throughput.

WTRU may be configured to perform opportunistic MIMO transmission and/or opportunistic MIMO reception. Opportunistic MIMO (O-MIMO) (e.g., which may harness transmission nodes, including nearby transmission nodes, irrespective of RATs) may improve user experience, for example, through leveraging potential (e.g., full potential) of MIMO techniques. The terms O-MIMO, inter-RAT joint transmission, inter-RAT joint communication, multi-RAT transmission, multi-RAT joint transmission, dynamic RAT selection, and/or joint RAT transmission may be used interchangeably herein. Opportunistic MIMO may generally be considered MIMO techniques that utilize various transmission nodes (e.g., one or more, or multiple, transmission antennas, one or more, or multiple, transceivers with corresponding antenna(s)), irrespective of radio access technology, to perform MIMO transmission techniques to improve transmission performance. Opportunistic MIMO may include techniques such as coordinated inter-RAT and/or multi-RAT transmissions, uncoordinated inter-RAT and/or multi-RAT communications, mobile assisted coordinated communications, mobile directed RAT, and/or a multi-RAT radio layer stack. Opportunistic MIMO may be used to facilitate group-based transmissions. The use of opportunistic MIMO may be enabled by social and/or context aware networking.

Figure 3:
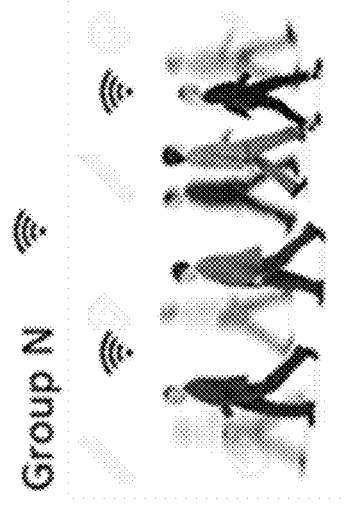
FIG. 3 depicts example group based communications.
Figure 3:
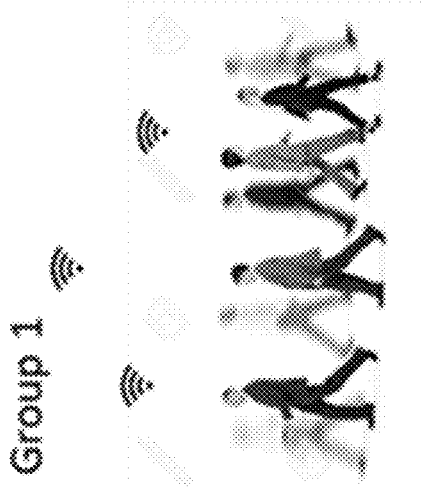

Group based communications may be performed using opportunistic MIMO. For example, as shown on FIG. 3, opportunities for simultaneous communication with transmission nodes utilizing different RATS may be group based.

One or more groups may be formed to address different requirements for multi-RAT opportunistic MIMO. Groups that may be formed may include the following groups: physical channel based group, performance based group, user priority based group, service and/or application based group, and/or virtual network based group. Physical channel based group may be formed based on the properties of wireless propagation channel. For example, rank of MIMO channel; RSSI, etc. Performance based group may be formed based on performance requirements.

For example, synchronization requirement, throughput/ data rate, quality of service (QOS), latency requirement, etc. User priority based group may be formed based on the user priority. Service and/or application based group may be formed based on the application and/or service. For example, Video group, VoIP group, etc. Virtual network based group may be formed based on the virtual network desired in the system (e.g., an enterprise system). For example, human resource group, engineer group, etc. One or more, or each, group may be allowed to customize some settings, for example, security and broadcast settings (e.g., their individual security and/or broadcast settings).

Figure 4:
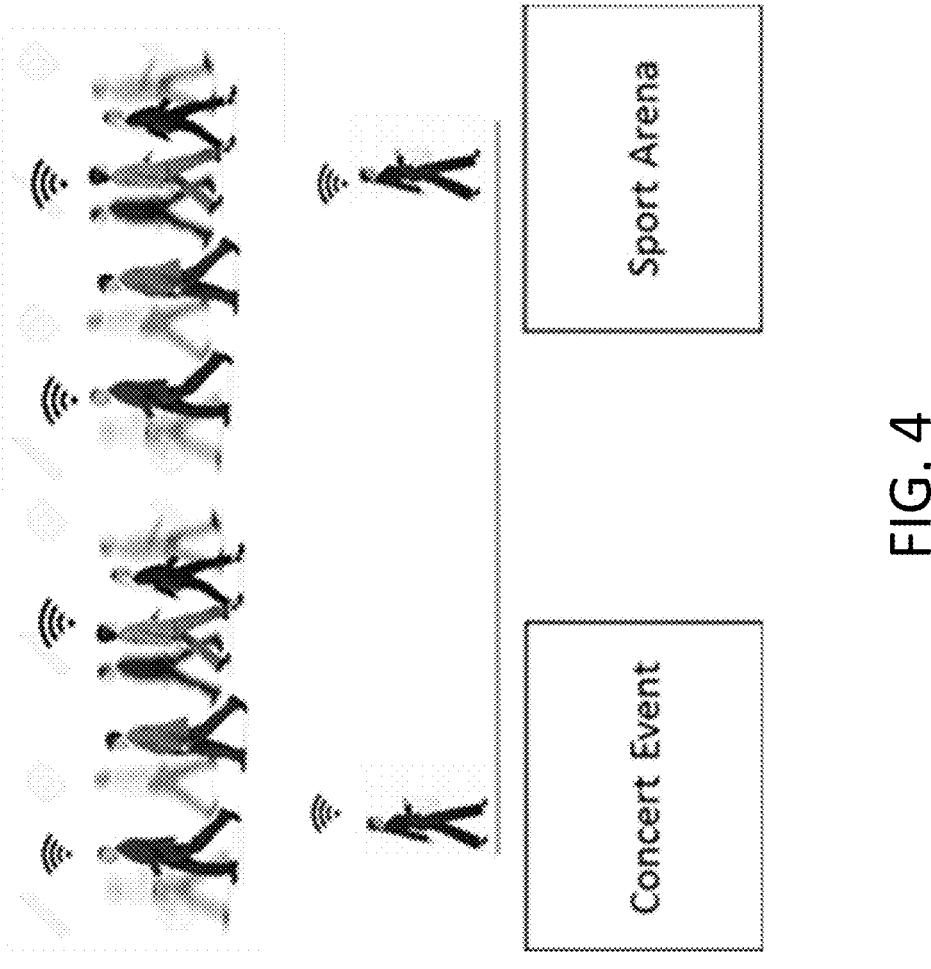
FIG. 4 depicts an example social and context aware Opportunistic MIMO (O-MIMO)

Opportunistic MIMO groups may be interlaced to enhance interference avoidance and alignment capabilities. As shown on FIG. 4, opportunistic MIMO enabled by social and context aware networking may be provided. Social networks may be a part (e.g., central part) of user interactions, e.g., user interactions with their mobile devices. An example of this may be the use of Facebook, Twitter, and other platforms to initiate and/or form large gatherings for social activities in groups. The context whereby these platforms may be used (e.g., such as a sports venue), may influence the usefulness for mobile data in dense networks. Leveraging knowledge (e.g., knowledge available through the mobile social networks) may enable the potential benefits of O-MIMO.

Figure 5:
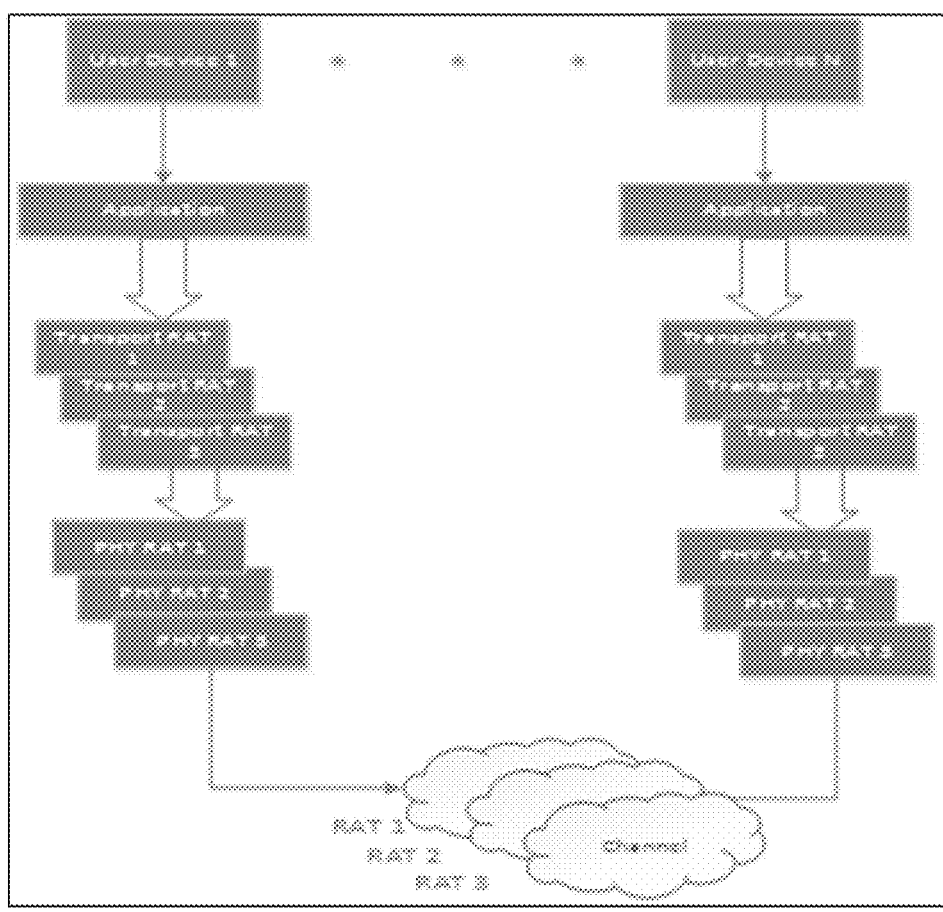
FIG. 5 depicts an example multi-RAT radio layer stack.

Multi-RAT Radio Layer Stack may be provided. A multi-RAT radio layer stack (e.g., a new multi-RAT radio layer stack) which supports (e.g., simultaneously supports) multi/ inter-RAT communications and/or is backward compatible with existing RATS (e.g., LTE, 802.11, etc.) may be disclosed. FIG. 5 shows an example multi-RAT radio layer stack. In Device n, an application layer packet may be passed to one or more transport RAT layers. Transport layer may construct a packet (e.g., its own packet), e.g., based on certain protocol and/or pass them to corresponding PHY RAT layers. Features of multi-RAT radio layer stack may include: supporting multiple, simultaneous, application, transport, and/or physical layer instantiations for one or more, or multiple, RATs; and/or scheduling and/or configuration parameters extended to support multiple simultaneous RATs.

Coordinated Inter-RAT Communications may be provided. Radio access technology (RAT) may be referred to as, but not limited to, an air interface which, e.g., may comprise one or more of the following: waveform, numerology of the waveform, signal structures, training sequences, physical channels, and/or frequency spectrum.

One or more transmission points (TPs) may be used for a signal transmission and/or the transmission points may be in same and/or different geographical locations. The transmission point may be used (e.g., interchangeably used) with base station (BS), node-B (NB), enhanced node-B (eNB), access point (AP), radio remote head (RRH), service node, node, and/or relay.

One or more TPs may be used for a downlink transmission, e.g., for a user equipment (UE), and/or the TPs may use a different RAT. For example, one or more, or multiple, TPs may be used for a downlink transmission for a WTRU, wherein the first TP may be based on the first RAT, and/or the second TP may be based on the second RAT. The terms UE, WTRU, mobile, mobile device, handset, device, RX device, end device, and/or user device may be used interchangeably.

Joint communication (e.g., transmission and/or reception) from multiple RATs may be provided. One or more TPs (e.g., using different RATs) may transmit the same or different signal(s) to a WTRU. One or more of following may apply:

A WTRU may receive and/or attempt to decode a downlink signal (e.g., based on a first RAT), and/or the WTRU may receive one or more parameters related to a second RAT used for a joint transmission. The parameter related to the second RAT may include one or more of the following: transmission point index; RAT index; information related to geographical location; and/or scheduling information (e.g., modulation order, coding rate, frequency resource, and/or time resource) of the signal transmitted in the second RAT. Joint transmission may include one or more of the following: a same information block may be transmitted from a first RAT and a second RAT; and/or a different information block may be transmitted from a first RAT and a second RAT.

A WTRU may receive and/or attempt to decode a downlink signal from one or more, or each, RAT, and/or the scheduling information for a RAT (e.g., one or more, or each, RAT) may be self-contained.

A primary RAT and/or a secondary RAT may be used, determined, defined, and/or configured. The primary RAT may be used for a WTRU to transmit and/or receive one or more of: broadcasting signal, which may include system configurations; and/or uplink and downlink control and/or data signals. The secondary RAT may be used for a WTRU to transmit and/or receive uplink and/or downlink control and/or data signals. The primary RAT may be determined based on initial access, and/or one or more secondary RATs may be configured via the primary RAT. The primary RAT may be a cellular network which may use licensed spectrum and/or unlicensed spectrum, and/or one or more secondary RATs may be a hotspot which may use unlicensed spectrum (e.g., may use unlicensed spectrum only). A primary RAT may be a RAT used in licensed spectrum and/or other RATs used in unlicensed spectrum may be secondary RATs. A first RAT (e.g., in licensed spectrum) may be a primary RAT and/or a second RAT (e.g., in unlicensed spectrum) may be a secondary RAT. The first RAT and second RAT may be the same RAT or a different RAT.

A WTRU may indicate the capability of a multi-RAT joint transmission/communication. A capability list for the supporting RATs may be indicated to a network.

A modulation scheme may be determined, e.g., determined based on the number RATs used for multi-RAT transmission. A WTRU may receive a first modulation scheme from a RAT, e.g., if a single RAT is used for a downlink transmission. A WTRU may receive a second modulation scheme from a RAT, e.g., if multiple RATs are used for a downlink transmission. A WTRU may receive a first modulation scheme from a certain RAT (e.g., when a single RAT is used) while the WTRU may receive a second modulation scheme from the RAT, wherein in the first modulation scheme is used for the RAT when a single RAT is used. A second modulation scheme may be a phase rotated version of a first modulation scheme. The phase rotation value may be determined based on the number of RATs used.

Dynamic RAT selection may be provided. A coordination set may be used to determine a set of TPs associated with a WTRU for a downlink transmission and/or the coordination set may include one or more TPs of one or more, or multiple, RATs. A coordination set of TPs may be determined based on WTRU capability, wherein the WTRU capability may include supporting multi-RAT transmission, transmit and receive capability of RATs, supported spectrum, and/or the like. A coordination set of TPs may be configured by one of the RATs for the WTRU based on WTRU capability. For example, one or more RATs may be used as a coordination RAT. The coordination RAT may carry coordination information, and/or control information, for the TPs. The TPs may communicate with each other, for example, using one or more RATs (e.g., coordination RATs). The RAT configuring the coordination set of TPs may be one or more of a primary RAT, currently connected RAT, RATs used for C-plane, and/or RATs used for downlink control channel. A coordination set of TPs may be configured by a broadcasting channel. A broadcasting channel may include information related to the transmission points which may, for example, be used for multi-RAT transmission.

A WTRU may report a preferred RAT information of one or more RATs configured, determined, and/or used in a coordination set.

The selection at a WTRU receiver may be based on one or more of the following criteria (e.g., which may be measurements that may be defined (e.g., universally defined) for O-MIMO system and/or comparable from one RAT to another): availability of the RAT, and/or system efficiency of the RAT. Availability of the RAT may include whether the RAT may serve the device within a certain time period. An example measurement of the availability of the RAT may be the traffic load of the RAT. Another example measurement of the availability of the RAT may be the RAT related measurement. For example, with a WiFi system, the average backoff time may be a valid measurement. An example measurement of system efficiency of a RAT may be the possible supported data rate. The supported data rate may be a data rate which, e.g., may be achievable by the physical link between the RAT transmission point and the UE. The supported data rate may depend on the distance between the RAT transmission point and the UE, the channel condition, etc.

One or more transmission points may be selected within the selected RAT. The WTRU may associate with one or more transmission point(s) within the RAT. Association with more than one transmission point may be supported. The capability of supporting association with more than one transmission point may be explicitly signaled in a control or management frame. The selection of transmission points may follow the criteria defined in the particular RAT.

The WTRU may signal RAT transmission point(s) (e.g., one or more, or each, of the RAT transmission point(s)) the information of the associated transmission points (e.g., all of the associated transmission points) in an O-MIMO system, for example, using a control and/or management frame, e.g., when more than one transmission point(s) within the selected RAT is selected.

Joint transmission from multiple transmission points may be supported within the same RAT. Synchronization and/or power control, etc., may be performed, e.g., before the Joint transmission.

A RAT may be selected for a WTRU without inter-RAT handover. Selected, determined, and/or configured, may be used may be used interchangeably.

A control information may be transmitted in a first RAT used in a licensed spectrum (e.g., a primary RAT), e.g., to indicate the selected RAT of a second RAT used in an unlicensed spectrum (e.g., a secondary RAT). The control information may include one or more of the following: scheduling information of data channel in the second RAT; selected RAT of the second RAT (e.g., RAT index); a partial information of the second RAT; and/or a transmission point index which may be associated with a RAT. The control information may be signaled via higher layer signaling, physical layer signaling, broadcasting, and/or the like.

A common control channel, which may be transmitted in the spectrum for multi-RAT transmission, may be defined among the RATs used for multi-RAT transmission. The common control channel may be used for the control information related to the RAT selection.

The common control channel may be transmitted in time/frequency resources configured periodically and/or occasionally. The common control channel may be based on a RAT which may be one of the RATs used for multi-RAT transmission. The common control channel may be based on one of the RATs used for multi-RAT transmission. The RAT used for common control channel may be determined based on one or more of following: a RAT among the RATs used for multi-RAT transmission may have a shortest TTI length, wider subcarrier spacing, and/or the like; and/or a RAT may be used for a cellular network.

A training sequence may be used to indicate the selected RAT. Training sequence, reference signal, beacon, and/or preamble may be used interchangeably. The training sequence may be used within the RATs used for multi-RAT transmission. A set of training sequences may be defined and/or used, and/or one or more, or each, training sequence may be associated with a certain RAT. A WTRU may blindly decode a training sequence index, and/or the WTRU may determine a RAT based on the training sequence index detected. The training sequence may be transmitted in a location (e.g., a known location). For example, the training sequence may be transmitted at the beginning of TTI, subframe, radio frame, and/or the like.

WTRU location assisted joint beamforming/precoding may be provided. A WTRU location information (e.g., positioning) may be used, e.g., for beamforming, from one or more, or multiple, transmission points. One or more of following may apply: a WTRU geographical location information may be reported, e.g., to assist the transmit beamforming from one or more, or multiple, transmission points. A WTRU might not measure (e.g., might not need to measure) channels from one or more, or multiple, transmission points using different RATs to select a preferred beam for one or more, or each, transmission point. A WTRU geographical location information may include one or more of the following: timing delay of one or more training sequences (e.g., associated with one or more, or multiple, transmission points); timing difference between one or more training sequences; received power of one or more training sequences associated with one or more, or multiple, transmission points; and/or received power difference between one or more training sequences.

A WTRU may report the geographical location (e.g., positioning) change based on WTRU (e.g., autonomously) determining the geographical location change (e.g., if the location change is larger than a predefined threshold), for example, if a timing delay change of a training sequence is larger than a predefined threshold, a WTRU may report the positioning change; and/or WTRU periodic reporting, wherein the periodicity may be configured via higher layer signaling and/or determined (e.g., determined based on a WTRU mobility).

Figure 6:
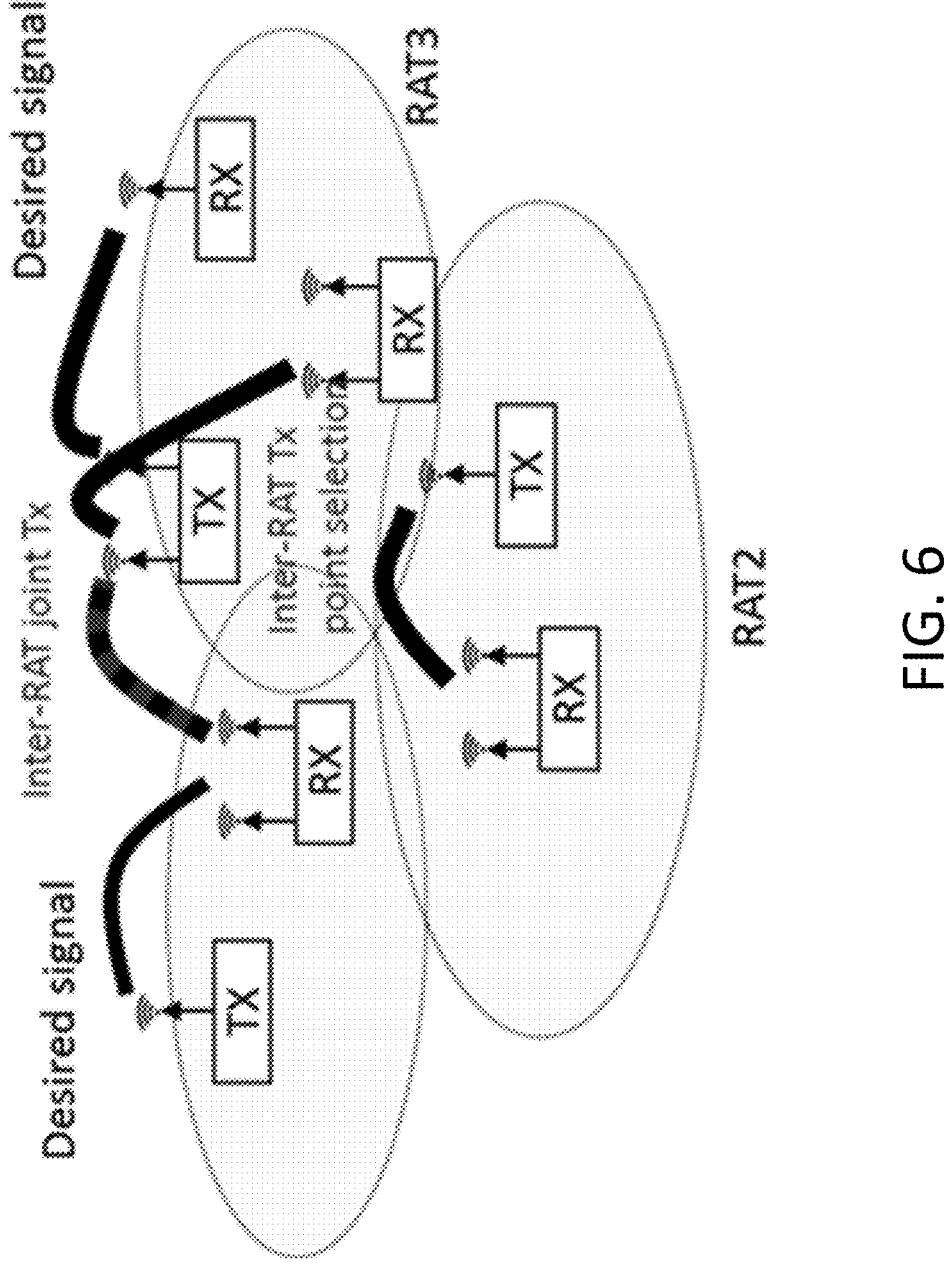
FIG. 6 depicts example inter-RAT joint communications.

An exemplary coordinated inter-RAT communication may be shown in FIG. 6. In this example, a RX within RAT 1, may have capability to receive a RAT 3 packet. A TX in RAT 1 may coordinate with a TX in RAT 3 to jointly transmit to the RX.

Figure 7:
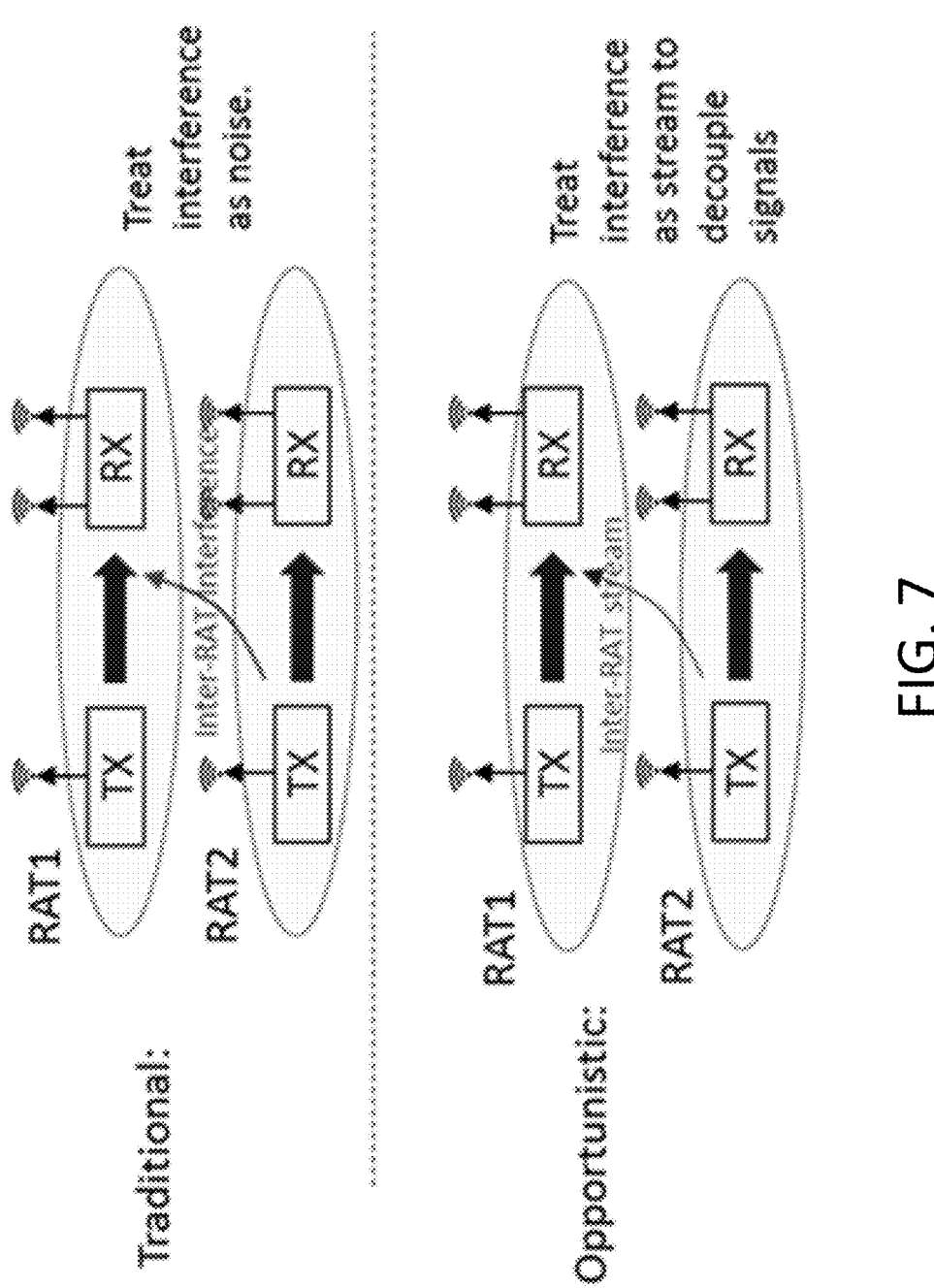
FIG. 7 depicts an example inter-RAT interference handling.

Un-coordinated Inter-RAT Communications may be provided. An un-coordinated inter-RAT communication might not require multiple RATs to coordinate. As shown in FIG. 7, the pair of nodes communicating within one RAT may be aware of a transmission in another RAT. The desired pair may monitor the interference transmission and/or decouple the signals (e.g., on purpose), for example, rather than treating the transmission in the other RAT as interference, for example with O-MIMO. Mobile may handle inter-RAT interference using one or more of rejection/suppression/decoupling of interference with MIMO receiver; and/or universal reference/training signals for one or more, or multiple, RATs for channel estimation to suppress uncoordinated interference. Rejection/suppression/decoupling of interference with MIMO receiver may be based on blind channel estimation of interfering signal, e.g., in the case that mobiles in one RAT might not understand the signal transmitted in another RAT, and/or rejection/suppression/decoupling of interference with MIMO receiver may utilize pilot-aided channel estimation of interfering signal, for example, in the case that mobiles in one RAT may understand the signal transmitted in another RAT. The pilot-aided channel estimation of the interference RAT system may be performed before the desired the transmission. Universal reference/training signals for one or more, or multiple, RATs (e.g., for channel estimation) may suppress uncoordinated interference Mobile Assisted Coordinated Communications may be provided. One or more transmission points from one or more, or multiple, RATs may coordinate to reduce the inter-RAT interference. Inter-RAT interference avoidance may be used.

A WTRU may report information (e.g., inter-RAT interference avoidance related information) to one or more transmission point(s) associated with one RAT and/or associated with one or more, or multiple, RATs. The inter-RAT interference avoidance related information may include one or more of following: interfering RAT(s) (e.g., interfering RAT index, wherein a set of RAT index may be configured via a broadcasting channel and a WTRU may indicate one or more interfering RAT indices); interfering transmission points (e.g., transmission point index of interfering RAT indicated); and/or interfering beam direction of interfering RAT (e.g., one or more interfering beam directions may be reported with the corresponding transmission point and/or RAT).

A WTRU may report and/or request preferred interference nulling resource(s). For example, a WTRU may request nulling of resources (e.g., certain physical resources, such as time, frequency, and/or spatial resources) from a certain transmission point. Interference nulling may include one or more of: no signal transmission in certain physical resources; signal transmission power is lower than a certain threshold; and/or signal received power is lower than a certain threshold. Interference nulling resource related information may include one or more of RAT index, time duration, frequency location, frequency bandwidth, beam direction (e.g., precoding vector/matrix index), and/or transmission point index.

Figure 8:
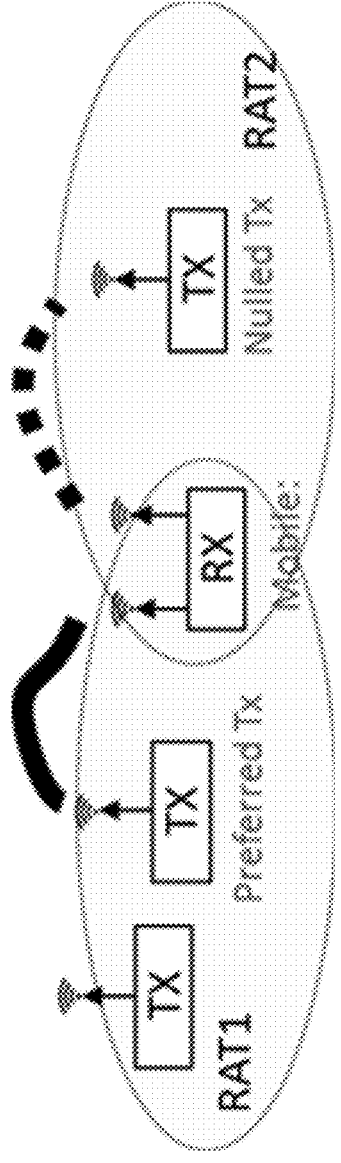
FIG. 8 depicts an example coordination across one or more, or multiple, RATs via a mobile device.
Figure 9:
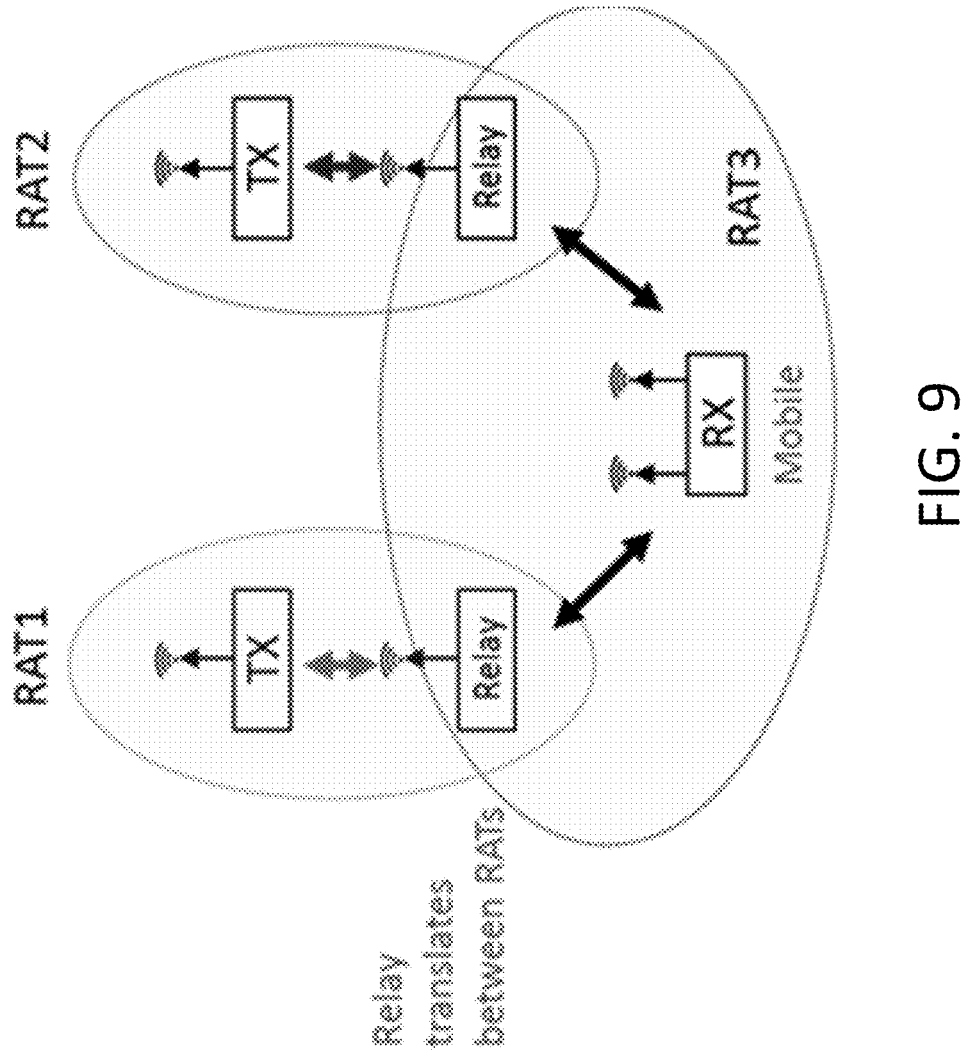
FIG. 9 depicts an example mobile directed RAT.

Coordination may be performed between RATs. The coordination may be assisted by a mobile device. As shown in FIG. 8, a mobile device (e.g., a RX device shown in the figure) may be in the range of both RAT 1 and RAT 2. The mobile device may be capable of communicating in RAT 1 and/or RAT 2. The mobile device may select one RAT (e.g., as desired RAT/RAT signal, selected RAT/RAT signal, preferred RAT/RAT signal, etc.), and set another RAT to another status (e.g., non-selected RAT/RAT signal, non-preferred RAT/RAT signal, or nulled RAT/RAT signal, etc.). As shown on FIG. 9, a mobile directed RAT may be provided, for example.

A transmission point may be capable to transmit and/or receive one or more RATs. For example, one or more transmission points may be used to transmit a downlink signal to a WTRU and/or the mode of operation of transmission points may be determined based on a WTRU capability.

The mode of operation may be a RAT used in a transmission point. For example, if a transmission point is capable of utilizing two RATs, the first mode of operation may be the signal transmission/reception based on the first RAT, and/or the second mode of operation may be the signal transmission/reception based on the second RAT.

The WTRU capability (e.g., the WTRU preference) may be signaled by using one or more of: a set of training sequences that may be predefined and/or a (e.g., one or more, or each) training sequence may be associated with a RAT; based on the WTRU RAT capability, a WTRU may send a training sequence associated with the RAT WTRU that may be capable in a known time/frequency resource; and/or the WTRU may monitor, receive, and/or attempt to decode a downlink signal in a known time/frequency resource associated with the uplink resource in which the training sequence transmitted. When the WTRU transmits the training sequence, the WTRU may select one of a set of training sequences (e.g., known training sequences) that is used to indicate one RAT of a set of RATs. One or more of the training sequences (e.g., RAT ID sequences) may be used to represent one or more RATs. The WTRU may operate on one or more RATs at the beginning. The WTRU may look at a known time/frequency resource (e.g., the first TTI in 3GPP RAT, and/or Beacon frame in WiFi RAT), to locate the RAT ID. The known time/frequency resource used to transmit the training signal and/or receive the downlink control information received based on transmission of the training signal may be RAT dependent. The downlink signal may be determined based on the RAT indicated from the training sequence. If the WTRU does not receive the downlink signal (e.g., the downlink signal associated with the indicated RAT in the known downlink resource), the WTRU may try to send a training sequence (e.g., another training sequence), e.g., in a next time.

A known time/frequency resource for a training sequence transmission for WTRU capability indication may be determined based on: a predefined configuration (e.g., a predefined configuration commonly used for the RATs) used for multi-RAT transmission; and/or an indication from a common control signal (e.g., which may be transmitted in a primary RAT and/or commonly used across one or more, or multiple, RATs). In one or more examples herein, a training sequence and/or a probe signal may be used interchangeably.

A transmission point may be used (e.g., as a translator between two different RATs). For example, if a transmission point is located between a WTRU and an eNB, and the eNB and WTRU use a different RAT for a signal transmission and/or reception, the transmission point may communicate with the eNB and/or WTRU (e.g., both the eNB and/or UE) to carry the information from eNB to UE, or vice-versa.

A WTRU may be configured to perform coordinated communication (e.g., transmission and/or reception) between a first RAT and a second RAT (e.g., an LTE RAT and a NR RAT).

A coordinated LTE and NR transmission may be used, for example, to handle interference between LTE and NR. For example, a coordinated LTE and NR transmission may be used to handle interference between LTE and NR, for example, due to sharing of the spectrum (e.g., wherein the spectrum shared by LTE and NR may be full or part of the system spectrum for NR).

The terms first RAT, LTE, LTE-A, LTE-A pro, bandwidth limited RAT (e.g., a RAT with limited bandwidth), legacy RAT, and/or existing RAT may be used interchangeably. One or more of following may apply for the first RAT. For example, for the RAT (e.g., first RAT), a maximum system bandwidth for a single component carrier may be limited to a certain bandwidth (e.g., 20 MHZ). For the RAT (e.g., first RAT), one or more component carriers may be used for a larger bandwidth than maximum single component bandwidth (e.g., 20 MHZ). For the RAT (e.g., first RAT), a waveform for downlink transmission may be based on OFDMA and/or a waveform for uplink transmission may be used on SC-FDMA (e.g., and/or Discrete Fourier Transform Spread Orthogonal Frequency Division Multiplexing (DFT-s-OFDM)). For the RAT (e.g., first RAT), a subcarrier spacing may be 15 kHz and/or 7.5 kHz. For the RAT (e.g., first RAT), a number (e.g., maximum number) of transmit antenna ports may be limited to a number (e.g., 32 and/or 64 antenna ports). For the RAT (e.g., first RAT), orthogonal resource based multiple access scheme may be used that may include (e.g., but not limited to) FDMA, TDMA, and/or SDMA.

For example, in an orthogonal resource based multiple access scheme, one or more, or multiple, WTRUs may share time/frequency resources (e.g., the same time/frequency resources) and/or orthogonal spatial resources (e.g., an antenna port) may be used by the WTRUs as a multiple access scheme (e.g., which may be referred to as spatial division multiple access (SDMA)). In an orthogonal resource based multiple access scheme, one or more WTRUs may be allocated with a frequency resource (e.g., a different frequency resource) in a TTI (e.g., same TTI), which may be referred to as frequency division multiple access (FDMA), while one or more WTRUs may be allocated with a time resource (e.g., different time resource) which may be referred to as time division multiple access (TDMA). In an orthogonal resource based multiple access scheme, one or more of FDMA, TDMA, and/or SDMA may be used at the same time. For the RAT, a same waveform and/or numerology may be used within a system bandwidth.

The terms a second RAT, NR, 5G RAT, and/or larger bandwidth RAT, a RAT with larger number of antenna ports, a RAT with wider system bandwidth, and/or LTE evolution RAT may be used interchangeably. One or more of the following may apply for the second RAT. For the RAT (e.g., second RAT), a system bandwidth (e.g., maximum system bandwidth) for a component (e.g., single component) carrier may be wider than the first RAT. For the RAT (e.g., second RAT), a waveform for downlink transmission may be determined, configured, selected, and/or used within one or more waveform candidates. For example, one or more waveforms may be predefined and/or one or more waveforms may be selected and/or determined for a certain time/frequency resource. For the RAT (e.g., second RAT), numerology (e.g., subcarrier spacing, CP length, and/or TTI length) may be determined, configured, selected, and/or used within one or more numerology candidates. For the RAT (e.g., second RAT), a maximum number of transmit antenna ports may be larger than that of the first RAT. For the RAT (e.g., second RAT), non-orthogonal resource based multiple access schemes and/or orthogonal resource based multiple access schemes may be used. The non-orthogonal resource based multiple access schemes may include power-based Non-Orthogonal Multiple Access (P-NOMA) in which one or more, or multiple, WTRUs (e.g., and/or one or more, or multiple, layers) may be scheduled with a power level (e.g., different power level) and/or a WTRU (e.g., which may be scheduled with a lower power level) may be informed about the scheduling information of the WTRU with a higher power level.

For example, the non-orthogonal resource based multiple access schemes may include Hierarchical constellation based NOMA (HC-NOMA) in which demodulation of the receive symbol constellation may be different according to the WTRU. The non-orthogonal resource based multiple access schemes may include Interleave division multiple access (IDMA) in which a signal for a WTRU (e.g., and/or a layer for one or more, or multiple, layer transmissions) may be associated with a WTRU-specific (e.g., and/or a layer specific) interleaver which may be referred to as random interleaved multiple access (RIMA). The non-orthogonal resource based multiple access schemes may include Sparse code multiple access (SCMA), in which a signal for a WTRU (e.g., and/or a layer for one or more, or multiple, layer transmission) may be associated with a WTRU-specific (e.g., and/or a layer specific) spreading code which may be similar to code division multiple access (CDMA). The non-orthogonal resource based multiple access schemes may include Resource spread multiple access (RSMA) in which a signal for a WTRU (and/or a layer for one or more, or multiple, layer transmission) may be associated with a WTRU-specific (e.g., and/or a layer specific) resource spreading code. A resource spreading code may map the encoded data symbols into a set of time and/or frequency resources.

For the second RAT, waveform, numerology, frame structure, and/or multiple access scheme may be determined (e.g., determined individually) for one or more, or each, part of time and/or frequency resources. For example, one or more time and/or frequency resource partitions may be defined, configured, and/or predetermined within a system bandwidth, and/or the waveform, numerology, frame structure, and/or multiple access scheme may be determined for at time (e.g., one or more, or each, time) and/or frequency resource partition.

A WTRU type (e.g., a first WTRU type) may have a capability to communicate with a single RAT (e.g., a first RAT and/or a second RAT), and/or a second WTRU type may have a capability to communicate with one or more RATs (e.g., a first RAT and a second RAT).

The first WTRU type may be a legacy LTE WTRU which might not have a capability to receive or transmit a second RAT signal. The second WTRU type may be an NR WTRU which may have a capability to receive and/or transmit an LTE signal and/or an NR signal.

A WTRU may indicate a capability (and/or a WTRU type) of supportable RAT to a network. For example, a second WTRU type may indicate a capability of supporting the first RAT and/or the second RAT.

A WTRU may indicate a supportable RAT by using one or more of following. A WTRU may indicate a supportable RAT by using a higher layer signaling. The higher layer signaling may be used during initial access procedures. A WTRU may indicate a supportable RAT, for example, by using a reserved uplink signal resource. For example, an uplink resource (e.g., PRACH resource and/or sounding reference signal) may be reserved for a first WTRU type and an uplink resource (e.g., another uplink resource, such as non-overlapped with the resource for the first WTRU type) may be reserved for a second WTRU type. A WTRU may determine one or more of the reserved uplink resource to indicate the WTRU type. A WTRU may indicate a supportable RAT, for example, by using an eNB (e.g., an eNB that may trigger the reporting of supportable RAT indication reporting). For example, an eNB may request a WTRU to report a WTRU type via higher layer signaling and/or physical layer signaling (e.g., downlink control information). A WTRU may indicate a supportable RAT by using a WTRU category that may indicate (e.g., implicitly indicate) the WTRU type (and/or supportable RATs).

A WTRU may indicate a transmission scheme (e.g., a preferred transmission scheme) which may be associated with a single RAT (e.g., a first RAT and/or a second RAT) and/or one or more, or multiple, RATs (e.g., a first RAT and/or a second RAT). The transmission scheme indication may be based on the interference level indication. For example, a WTRU may report an interference level of the signal from a different RAT. A WTRU with a second WTRU type may be served with a RAT (e.g., a second RAT) and/or the WTRU may measure a signal strength from a RAT (e.g., another RAT, such as a first RAT) and may report the measured signal strength. The signal strength measured from the other RAT may be referred to as inter-RAT interference. The signal strength may be measured from a reference signal. A WTRU may report the inter-RAT interference (e.g., may report the inter-RAT interference periodically) if configured. A WTRU may be triggered to report inter-RAT interference. For example, an eNB may trigger the inter-RAT interference reporting. If inter-RAT interference level is higher than a predetermined threshold, a WTRU may report the inter-RAT interference level.

A WTRU may indicate a preferred RAT in a coordination set (e.g., a first RAT and/or a second RAT may be configured in a coordination set). A WTRU may indicate a preferred RAT during initial access. A WTRU may indicate a preferred RAT with a physical cell-ID for cell-selection or cell-reselection.

One or more RATs (e.g., which may coordinate to transmit and/or receive a signal for a WTRU) may be referred to as a coordination set. A WTRU may receive one or more signals from one or more RATs in a coordination set. For example, if a first RAT (e.g., LTE) and a second RAT (e.g., NR) exist in a coordination set, a WTRU may receive a signal from the first RAT and/or a second RAT. A coordination set may be configured in a WTRU-specific manner. For example, a coordination set may be configured for a WTRU, based on inter-RAT interference measurement. A coordination set may be indicated from a broadcasting channel, for example, in a second RAT. A coordination set may be used for (e.g., only used for) a second WTRU type.

A WTRU may be configured to utilize resource sharing for multi-RAT COMP. For example, a WTRU may utilize techniques such as Partial Interference Avoidance. Partial Interference Avoidance techniques may include, for example, limiting the amount of transmission resources shared between a first RAT signal (e.g., or a portion thereof) and a second RAT signal (e.g., or a portion thereof).

As an example, a numerology of a RAT (e.g., second RAT) may be determined, for example, based on a numerology of a first RAT (e.g., for the time/frequency resources shared by the first RAT and/or the second RAT). For example, a subcarrier spacing of the RAT (e.g., second RAT) (e.g., for the time/frequency resources shared by the first RAT) may be based on an integer multiple of the subcarrier spacing of the first RAT, or vice-versa. A TTI length of a second RAT may be determined based on the TTI length of a first RAT. The TTI length of a second RAT may be selected, determined, and/or used as integer multiple of the TTI length of a first RAT, or vice-versa.

A priority rule of physical signals between different RATs may be predefined, used, and/or configured. For example, a synchronization signal in a first RAT may be prioritized over physical signals (e.g., all physical signals) in a second RAT. One or more of the following rules (e.g., priority rules) may apply. A priority rule may include a broadcasting signal (e.g., PBCH) in a first RAT, for example, that may have a higher priority than a unicast traffic related signal (e.g., control and data channels for unicast traffic) in a second RAT. A priority rule may include a cell-specific reference signal (e.g., CRS) in a first RAT that may have a higher priority than a unicast traffic related signal in a second RAT. A cell-specific reference signal in a first RAT may have a higher priority than data channel in a second RAT, for example, while having the same priority with control channel in the second RAT. A priority rule may include a demodulation reference signal (e.g., DM-RS) in a first RAT that may have a higher priority than a data channel in a second RAT. A priority rule may include a measurement reference signal in a second RAT that may have a higher priority than a unicast traffic related signal (e.g., PDSCH, PUSCH, and/or PDCCH) in a first RAT.

A lower priority signal may be punctured, for example, if one or more (e.g., two) signals in RATs (e.g., different RATs) are overlapped in a time/frequency resource. A WTRU (e.g., which may have a capability to receive and/or transmit signals for one or more, or multiple, RATs) may receive signals from one or more, or multiple, RATs in a time/frequency resource. The signals from one or more RATs may be transmitted (e.g., transmitted simultaneously), and/or signals from one or more RATs may be punctured based on a predetermined priority rule. Puncturing, muting, zero-power signal transmission, and/or rate-matching may be used interchangeably.

A lower priority signal in a RAT may be punctured. A WTRU may assume that the higher priority signal is transmitted when a lower priority signal is punctured. An equivalent number of time/frequency resources overlapped with a higher priority signal may be punctured. For example, if the TTI length of a first RAT is an integer multiple of the TTI length of a second RAT (e.g., and/or a TTI of a first RAT is a higher priority), one or more, or multiple, TTIs in a second RAT (e.g., which may overlap with a higher priority TTI of a first RAT) may be punctured.

Priority signals (e.g., and/or no priority signals) may be transmitted (e.g., transmitted simultaneously). If signals (e.g., one or more, or multiple, signals) from RATs (e.g., different RATs) have a same priority and/or a no priority rule, the one or more, or multiple, signals may be transmitted (e.g., transmitted simultaneously). A WTRU may determine that signals (e.g., one or more, or multiple, signals) may be transmitted (e.g., transmitted simultaneously) and/or the WTRU may receive signals (e.g., one or more, or multiple, signals), based on one or more scheduling information. One or more of the following information may be indicated to a WTRU. Information that may be indicated to a WTRU may include Power level of the signals. For example, a WTRU may receive, decode, and/or attempt to decode a signal from a RAT with a higher signal power, and/or the WTRU may cancel out the signal decoded from (e.g., first from) the receive signal and/or successively decode a signal from a RAT (e.g., another RAT), etc. Information that may be indicated to a WTRU may include Associated RAT. A WTRU may attempt to decode and/or receive a signal from a certain RAT (e.g., second RAT) and the WTRU may attempt to cancel the signal decoded from (e.g., first from) the received signal. The signal detection order at a WTRU receiver may be determined, for example, based on the associated RAT. For example, a WTRU may attempt to decode the signal from a second RAT first and the WTRU may attempt to decode the signal from a first RAT from a received signal. Information that may be indicated to a WTRU may include Modulation and/or coding scheme used for one or more, or each, RAT. Information that may be indicated to a WTRU may include multiple access scheme associated with one or more, or each, RAT.

A WTRU may be scheduled with one or more time/frequency resources of a second RAT. A part of the scheduled time/frequency resources may be a lower priority signal, for example, due to the overlapping with a higher priority signal of a first RAT. A first part of the scheduled resource may be referred to as a second RAT only signal and a second part of the scheduled resource may be referred to as multi-RAT (e.g., a first RAT and/or a second RAT) CoMP signal. One or more of the following may apply. The priority rule may apply for the second part of the scheduled resource. The priority rule may apply for scheduled resources (e.g., all scheduled resources). The modulation and/or coding scheme may apply and/or may be determined based on the second part of the scheduled resource and/or may be used for scheduled resources (e.g., all scheduled resources). The modulation and/or coding scheme may apply and/or may be determined (e.g., determined independently) for one or more (e.g., the first and/or the second) parts of the scheduled resource. Puncturing may apply for a lower priority signal (e.g., may only apply for a lower priority signal).

For example, puncturing may be used for (e.g., only for) a part (e.g., the second part) of the scheduled resource if its priority is low and/or the first part of signal may be transmitted without puncturing. A waveform may apply and/or may be determined (e.g., determined independently) for a part (e.g., the first part) of the scheduled resource and/or a part (e.g., the second part) of the scheduled resource. For example, a first waveform (e.g., ZT DFT-s-OFDM) may be used for a part (e.g., a first part) of the scheduled resource and/or a second waveform (CP-OFDM) may be used for a part (e.g., a second part) of the scheduled resource. A numerology may apply and/or may be determined (e.g., determined independently) for a part (e.g., the first part) of the scheduled resource and/or a part (e.g., the second part) of the scheduled resource. For example, a numerology (e.g., the same numerology) with that of a first RAT may be used for a part (e.g., the second part) of the scheduled resource of a second RAT, while a numerology (e.g., a different numerology) with that of a first RAT may be used for a part (e.g., the first part) of the scheduled resource.

A WTRU may be configured to process Non-orthogonal Joint Transmissions, for example Non-orthogonal Joint Transmissions between a first RAT (e.g., LTE) and a second RAT (e.g., NR).

A WTRU may receive, attempt to decode, and/or decode a signal from a RAT, for example, with a certain waveform, numerology, and/or multiple access scheme. A WTRU may receive, attempt to decode, and/or decode a signal from a RAT, for example, with a certain waveform, numerology, and/or multiple access scheme based on signal type. The signal type may be determined according to resource overlapping with a different RAT in a coordination set. For example, a first signal type may be a signal overlapped with a different (e.g., higher) priority signal from a different RAT in a coordination set. The second signal type may be a signal non-overlapped with a higher priority signal from a different RAT in a coordination set. The second signal type may be the signal scheduled in a time/frequency resource overlapped with a priority (e.g., a same priority and/or a lower priority) signal from a RAT (e.g., different RAT) in a coordination set. The second signal type may be the signal scheduled in a time/frequency resource non-overlapped with a signal from a RAT (e.g., different RAT) in a coordination set.

A waveform, numerology, and/or frame structure may be determined based on the signal type. For example, the TTI length of a signal type (e.g., first signal type) may be determined based on the TTI length of a priority (e.g., higher) priority signal overlapped from a different RAT while the TTI length of a signal type (e.g., second signal type) may be predetermined, indicated from higher layer signaling, and/or determined based on cell-ID. A WTRU may determine a waveform, numerology, and/or frame structure based on the signal type for the reception and/or transmission of a signal. A WTRU may determine an access scheme (e.g., a multiple access scheme) based on the signal type. For example, a first multiple access scheme (e.g., non-orthogonal multiple access schemes) may be used for a signal type (e.g., a first signal type) and/or an access scheme (e.g., a second multiple access scheme, such as an orthogonal multiple access scheme) may be used for a signal type (e.g., a second signal type).

A WTRU may receive one or more signals from one or more RATs, for example, in a coordination set. The WTRU may decode one or more signals based on an order (e.g., a predetermined order). For example, the WTRU may decode (e.g., first decode) a signal with an access scheme (e.g., a first multiple access scheme, such as a non-orthogonal multiple access scheme) used, and/or the WTRU may decode a signal with an access scheme (e.g., a second multiple access scheme, such as an orthogonal multiple access scheme) used. A WTRU may cancel out the signal with an access scheme (e.g., a first multiple access scheme) used from a received signal and/or decode the signal with an access scheme (e.g., a second multiple access scheme). The decoding order of one or more signals from one or more RATs may be determined based on one or more of following. The decoding order of one or more signals from one or more RATs may be determined based on one or more access schemes used. The decoding order of one or more, or multiple, signals from one or more RATs may be determined based on a modulation order (e.g., and/or constellation) used. The decoding order of one or more, or multiple, signals from one or more RATs may be determined based on a RAT index, for example, in a coordination set. The decoding order of one or more, or multiple, signals from one or more RATs may be determined based on a waveform used. The decoding order of one or more, or multiple, signals from one or more RATs may be determined based on a numerology used. The decoding order of one or more, or multiple, signals from one or more RATs may be determined based on one or more system parameters (e.g., physical cell ID, system bandwidth, etc.).

The parameters for a signal from a RAT may be indicated from a higher layer signaling and/or physical layer signaling (e.g., downlink control information).

A WTRU may be configured to transmit uplink references signals that are utilized by one or more RATs. Such techniques for utilizing one or more reference signals across one or more, or multiple, RATs may be referred to as Uplink Reference Signal Sharing.

A WTRU which may have a capability of one or more RATs may be scheduled, and/or configured, to transmit sounding reference signal (SRS) for the one or more RATs in a coordination set. The SRS transmission in one or more RATs may be determined based on one or more of following. The SRS transmission in one or more RATs may be determined based on a first type SRS and/or a second type SRS used. The first type SRS may be an SRS transmission in a frequency resource which may be shared with a RAT in a coordination set, and/or the second type SRS may be an SRS transmission in a frequency resource which may be used by one or more RATs. The SRS transmission in one or more RATs may be determined.

For example, the SRS transmission in one or more RATs may be determined based on a WTRU which may be configured to transmit one or more SRS (e.g., first type SRS) in one or more RATs (e.g., different RATs). A WTRU may transmit the SRS (e.g., first type SRS) in one or more RATs. A WTRU may determine the RAT in which the WTRU may transmit the SRS (e.g., the first type SRS) based on one or more of the following. A WTRU may determine the RAT in which the WTRU may transmit the first type SRS, based on a predetermined rule. For example, a primary RAT may be determined, configured, and/or used within the RATs in a coordination set and/or the WTRU may transmit the SRS (e.g., first type SRS) in a RAT (e.g., priority RAT). A WTRU may determine the RAT in which the WTRU may transmit the first type SRS based on an indication. A signaling (e.g., higher layer signaling) and/or a downlink control channel which may trigger an SRS transmission may indicate a RAT index for the SRS (e.g., first type SRS) transmission. A WTRU may transmit the second type SRS in a RAT (e.g., the associated RAT).

A WTRU may transmit the SRS (e.g., first type SRS) in one or more RATs, for example, if the time resource for the SRS (e.g., first type SRS) transmission is overlapped with one or more RATs. A WTRU may transmit the SRS (e.g., first type SRS) in a RAT (e.g., an associated RAT) in a time resource scheduled and/or configured, for example, if the SRS transmission is not overlapped with a SRS transmission for a RAT (e.g., different RAT). A WTRU may transmit the SRS (e.g., first type SRS) in a RAT (e.g., a predetermined RAT, such as a primary RAT) if one or more SRS transmissions for one or more RATs may be overlapped in a resource (e.g., the same time resource).

The SRS, uplink reference signal, and/or uplink measurement reference signal may be used interchangeably.

A WTRU may be configured to utilize one or more control channels for multi-RAT COMP. For example, a primary RAT and a secondary RAT may be utilized by the WTRU and/or the WTRU may transmit and/or receive a control channel that facilitates multi-RAT COMP and/or multi-RAT joint communication between the first and second RATs.

A WTRU may have and/or may be configured with a primary RAT and/or one or more secondary RATs. RATs may use one or more of waveforms, numerology, and/or frame structures. For example, RATs may use one or more of different waveforms, different numerology, and/or different frame structures.

A primary RAT may be a RAT with which the WTRU may synchronize, camp on, maintain an RRC connection, acquire and/or maintain security parameters or protocols, etc. A primary RAT may be a RAT on which a WTRU may monitor (e.g., always monitor except during periods of DRX) a control channel.

A WTRU may receive a control channel on a RAT (e.g., a primary RAT) that may schedule resources on the RAT (e.g., the primary RAT) and/or another RAT (e.g., a secondary RAT). The control information that may be carried by the control channel may be based on the RAT being scheduled. For example, the control information may include an indicator, for example, a RAT-flag that may indicate the RAT being scheduled. The contents of the control information may depend on the state and/or value of the RAT flag.

A RAT may be LTE. The control information may include LTE scheduling information, for example, when the RAT flag indicates LTE. A RAT may be a new radio (NR) that may use a variable numerology and/or a waveform such as DFT-s-OFDM. The control information may include scheduling and/or parameters associated with a DFT-s-OFDM waveform, for example, when the RAT flag may indicate NR and/or DFT-s-OFDM. The control information may include parameters related to a unique word. The control information may include parameters from which the WTRU may determine the numerology for the scheduled transmission (e.g., in the DL and/or UL). A unique word may be a predefined sequence, a set of subcarriers with a known signals, and/or a zero power signal.

The network may change the primary RAT of a WTRU, for example, by handing over the WTRU to the new RAT. For example, a WTRU may receive configuration (e.g., via higher layer signaling) on a RAT (e.g., first RAT) that may indicate to the WTRU to change its primary RAT to a second RAT. The WTRU may synchronize (e.g., in the DL) with the new RAT. The WTRU may send a transmission to the new RAT, for example, to obtain UL synchronization with the new RAT. The WTRU may indicate (e.g., via the new RAT) that the handover may have completed (e.g., completed successfully). The WTRU may, for example, monitor the control channel on the second RAT.

A WTRU may transmit and/or receive a RAT Control Channel. A control channel for a first RAT may be transmitted, received, and/or used, for example, based on a timing (e.g., a first timing). A control channel for a second RAT may be transmitted, received, and/or used, for example, based on a timing (e.g., a first timing).

A RAT control channel (e.g., first RAT control channel) may be transmitted in time periods (e.g., transmitted in subframes, such as 1 ms). The control channel may be transmitted in symbols at the beginning of a subframe. The RAT (e.g., second RAT) control channel may be transmitted in time periods that may be a fraction of the transmission time periods of the RAT (e.g., first RAT), for example, 100 us and/or 125 us.

A RAT (e.g., first RAT) control channel may indicate to a WTRU to monitor a control channel of a RAT (e.g., second RAT), for example, in one or more time periods (e.g., second RAT time periods) that may be within a time period (e.g., first RAT time period). The RAT (e.g., first RAT) control channel may include parameters (e.g., time/frequency information, scheduling information, search space information, downlink control information (DCI), other control information, etc.) to enable the WTRU to monitor the control channels of the RAT (e.g., second RAT). A WTRU may monitor a RAT (e.g., first RAT) control channel. The WTRU may monitor a RAT (e.g., second RAT) control channel, for example, if the RAT (e.g., first RAT) control channel indicates to monitor a RAT (e.g., second RAT) control channel.

A RAT (e.g., first RAT) control channel may be transmitted in one or more time periods (e.g., subframes, such as 100 us and/or 125 us). The control channel may be transmitted in symbols, for example, at the beginning of a subframe. The RAT (e.g., second RAT) control channel may be transmitted in time periods that may be different from (e.g., longer than), for example, one or more time periods of the RAT (e.g., first RAT), for example, 1 ms.

A RAT (e.g., first RAT) control channel may indicate to a WTRU to monitor a control channel of a RAT (e.g., second RAT), for example, in one or more RAT (e.g., second RAT) time periods that may follow one or more RAT (e.g., first RAT) time periods. The WTRU may activate and/or deactivate joint communication across the first RAT and the second RAT, perhaps for example based on information monitored in one or more RAT control channels (e.g., scheduling information, search space information, or downlink control information (DCI), etc.).

A WTRU may be configured to transmit and/or receive from overlapping RATs (e.g., RATs that share or partially share spectrum and/or other transmission resources).

For example, the spectrum of one or more (e.g., two) RATs may overlap. For example, a RAT e.g., an LTE RAT) may comprise the lower and/or upper X MHz (e.g., 20 MHz) of a larger BW. A RAT (e.g., NR) may use the larger BW (e.g., the entire larger BW), for example, 100 MHz.

NR may be used to account for signals in the legacy RAT that may be considered important. NR may be used to account for signals in the legacy RAT that may be considered important, for example, to use both RATs (e.g., without interference and/or impact to legacy WTRUs operating in the legacy LTE RAT).

When transmitting in one RAT (e.g., NR), transmission may be punctured to avoid collision with one or more legacy signals (e.g., PDCCH). For example, NR transmission that overlap legacy PDCCH transmission may be punctured. NR transmission that overlap legacy reference signals may be punctured. NR transmission that overlay legacy synchronization signals may be punctured.

A WTRU that may receive a transmission on a RAT (e.g., first RAT) may receive configuration for a RAT (e.g., second RAT). The WTRU may use that configuration to determine the transmission resources on the RAT (e.g., first RAT) that may be punctured, for example, to avoid collision with signals that may be important on the RAT (e.g., second RAT).

A WTRU may be configured with a set of one or more parts of the RAT (e.g., first RAT BW) that may be over-lapped with a RAT (e.g., second RAT BW). For example the WTRU may receive a configuration that may indicate one or more frequency blocks (e.g., of X MHz) within a RAT BW (e.g., the first RAT BW) that may be overlapped with a RAT (e.g., a second RAT). X may be one or more of 1.4, 3, 5, 10, 20, etc., for example for a RAT (e.g., second RAT) of LTE. One or more of the overlapping frequency blocks may have a value of X that may be different from one or more frequency blocks (e.g., overlapping frequency blocks).

The WTRU may receive a configuration that may enable the WTRU to determine the time and/or frequency resources of the RAT (e.g., second RAT) with which a RAT (e.g., first RAT) may avoid collision and/or may puncture a RAT (e.g., first RAT) transmission. For an overlapping frequency block, the WTRU may receive configuration that may enable the WTRU to determine the time and/or frequency resources of the RAT (e.g., second RAT) with which a RAT (e.g., the first RAT) may avoid collision and/or may puncture a RAT (e.g., first RAT) transmission.

A WTRU may be configured with one or more of the following. For example, a WTRU may be configured with one or more of the following for a second RAT (e.g., an LTE RAT). A WTRU may be configured with an MBSFN sub-frame configuration. A WTRU may be configured with a blank subframe configuration (e.g., an almost blank sub-frame configuration). A WTRU may be configured with one or more ePDCCH configurations. A WTRU may be config-ured with subbands, for example, that may be used for NB-IoT. A WTRU may be configured with a number (e.g., maximum number) of symbols that may be used for PDCCH.

TDD UL/DL configuration, and/or an indication of the subframes that may be UL subframes (e.g., for a second RAT) may be TDD.

With an MBSFN subframe configuration, the WTRU may determine subframes in which CRS may (e.g., may only) be present in the control region symbols. In MBSFN subframes of a second RAT, a first RAT may (e.g., may only) avoid collision with one or more control channel symbols.

Although features and/or elements described herein may consider 802.11 specific protocols, the features and/or ele-ments provided herein may not be restricted to this scenario and/or may be applicable to other wireless systems. Although SIFS is used to indicate various inter frame spacing, all other inter frame spacing (e.g., RIFS and/or other agreed time interval(s)) may be applied.

Although features and/or elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless con-nections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A wireless transmit/receive unit (WTRU) comprising a processor and memory configured to:

receive information that indicates a first set of downlink resources associated with a downlink transmission that uses a New Radio (NR) radio access technology, wherein at least a portion of spectrum utilized by the NR radio access technology is shared with a Long Term Evolution (LTE) radio access technology;

receive, from a base station via a transceiver using the NR radio access technology, configuration information associated with the LTE radio access technology, wherein the configuration information received using the NR radio access technology indicates cell-specific reference signal transmission information for the LTE radio access technology;

determine that a subset of the first set of downlink resources associated with the downlink transmission that uses the NR radio access technology overlaps with a second set of resources associated with a cell-specific reference signal transmission for the LTE radio access technology based on the cell-specific reference signal transmission information for the LTE radio access technology indicated by the configuration information received using the NR radio access technology; and receive, from the base station via the transceiver, the downlink transmission that uses the NR radio access technology, wherein the downlink transmission is not received on the subset of the first set of downlink resources on the NR radio access technology that overlaps with the second set of resources associated with the cell-specific refer-ence signal transmission for the LTE radio access technology.

2. The WTRU of claim 1, wherein the downlink trans-mission comprises a physical downlink shared data channel (PDSCH) transmission.

3. The WTRU of claim 1, wherein the first set of downlink resources overlaps with the second set of resources in time and frequency.

4. The WTRU of claim 1, wherein to receive the downlink transmission on the NR radio access technology via resources of the first set of downlink resource elements that do not overlap with the second set of resources, the proces-sor is further configured to decode the downlink transmis-sion on the NR radio access technology on resources of the first set of downlink resources that do not overlap with the second set of resources.

5. The WTRU of claim 1, wherein the processor is further configured to determine that the cell-specific reference sig-nal transmission on the LTE radio access technology has a priority that is higher than the downlink transmission on the NR radio access technology.

6. The WTRU of claim 1, wherein the portion of the spectrum utilized by the NR radio access technology that is shared with the LTE radio access technology comprises an overlapping portion of a 20 MHz LTE bandwidth and a 100 MHz NR bandwidth.

7. The WTRU of claim 1, wherein the configuration information comprises a multicast-broadcast single-fre-quency network (MBSFN) subframe configuration, and wherein the subset of the first set of downlink resources is further determined based on the MBSFN subframe configuration.

8. A method implemented in a wireless transmit/receive unit (WTRU), the method comprising:
  receiving information that indicates a first set of downlink resources associated with a downlink transmission that uses a New Radio (NR) radio access technology, wherein at least a portion of spectrum utilized by the NR radio access technology is shared with a Long Term Evolution (LTE) radio access technology;
  receiving, from a base station via a transceiver using the NR radio access technology, configuration information associated with the LTE radio access technology, wherein the configuration information received using the NR radio access technology indicates cell-specific reference signal transmission information for the LTE radio access technology;
  determining that a subset of the first set of downlink resources associated with the downlink transmission that uses the NR radio access technology overlaps with a second set of resources associated with a cell-specific reference signal transmission for the LTE radio access technology based on the cell-specific reference signal transmission information for the LTE radio access technology indicated by the configuration information received using the NR radio access technology; and
  receiving, from the base station via the transceiver, the downlink transmission that uses the NR radio access technology,
  wherein the downlink transmission is not received on the subset of the first set of downlink resources on the NR radio access technology that overlaps with the second set of resources associated with the cell-specific reference signal transmission for the LTE radio access technology.

9. The method of claim 8, wherein the downlink transmission comprises a physical downlink shared data channel (PDSCH) transmission.

10. The method of claim 8, wherein the first set of downlink resources overlaps with the second set of resources in time and frequency.

11. The method of claim 8, wherein receiving the downlink transmission on the NR radio access technology via resources of the first set of downlink resources that do not overlap with the second set of resources comprises decoding the downlink transmission on the NR radio access technology on resources of the first set of downlink resource elements that do not overlap with the second set of resources.

12. The method of claim 8, further comprising determining that the cell-specific reference signal transmission on the LTE radio access technology has a priority that is higher than the downlink transmission on the NR radio access technology.

13. The method of claim 8, wherein the configuration information comprises a multicast-broadcast single-frequency network (MBSFN) subframe configuration, and wherein the subset of the first set of downlink resources is further determined based on the MBSFN subframe configuration.

* * * * *